US008322128B2

(12) United States Patent
Mitani

(10) Patent No.: US 8,322,128 B2
(45) Date of Patent: Dec. 4, 2012

(54) HYDROGEN ENGINE USING A RECIRCULATING WORKING MEDIUM

(75) Inventor: Shinichi Mitani, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 660 days.

(21) Appl. No.: 12/280,207

(22) PCT Filed: Feb. 26, 2007

(86) PCT No.: PCT/JP2007/054114
§ 371 (c)(1),
(2), (4) Date: Aug. 21, 2008

(87) PCT Pub. No.: WO2007/100115
PCT Pub. Date: Sep. 7, 2007

(65) Prior Publication Data
US 2010/0236509 A1    Sep. 23, 2010

(30) Foreign Application Priority Data

Feb. 24, 2006   (JP) .................................. 2006-48707

(51) Int. Cl.
*F01N 3/00* (2006.01)
(52) U.S. Cl. .................. 60/279; 60/278; 60/287; 60/292
(58) Field of Classification Search .................... 60/278, 60/287, 292, 324, 279
See application file for complete search history.

(56) References Cited

U.S. PATENT DOCUMENTS

| 3,844,262 A * | 10/1974 | Dieges ......................... 123/567 |
| 3,969,899 A * | 7/1976 | Nakazawa et al. .............. 60/670 |
| 3,982,878 A | 9/1976 | Yamane et al. |
| 7,080,506 B2 * | 7/2006 | Fukuzumi et al. .............. 60/278 |
| 2002/0189332 A1 * | 12/2002 | Schell .......................... 73/118.1 |
| 2006/0204799 A1 * | 9/2006 | Ishikawa et al. ................ 429/19 |

FOREIGN PATENT DOCUMENTS

| DE | 27 38 638 | 3/1978 |
| DE | 10107837 A1 * | 9/2002 |
| JP | 50-155468 | 12/1975 |
| JP | 53-27711 | 3/1978 |
| JP | 3-501993 | 5/1991 |

(Continued)

OTHER PUBLICATIONS

Office Action from the Japanese Patent Office for JP Appl. No. 2006-048707 dated Sep. 8, 2010.

(Continued)

*Primary Examiner* — Thomas Denion
*Assistant Examiner* — Abdul Elnoubi
(74) *Attorney, Agent, or Firm* — Finnegan, Henderson, Farabow, Garrett & Dunner, LLP

(57) ABSTRACT

A hydrogen engine 10 supplies hydrogen, oxygen, and an argon gas serving as a working to a combustion chamber 21 to combust the hydrogen. $H_2O$ in a recirculating gas discharged from the combustion chamber 21 is separated and eliminated from the gas by a condenser 66. A three-way valve 72 is switched over in such a manner that the recirculating gas flows through a product eliminating section 70 (a carbon dioxide absorbing unit 71), when the concentration of carbon dioxide in the recirculating gas is higher than a predetermined concentration, so that the carbon dioxide is separated and eliminated from the recirculating gas.

9 Claims, 13 Drawing Sheets

FOREIGN PATENT DOCUMENTS

| | | |
|---|---|---|
| JP | 3-238025 | 10/1991 |
| JP | 5-256160 | 10/1993 |
| JP | 11-93681 | 4/1999 |
| JP | 11093681 A * | 4/1999 |
| JP | 2006077638 A * | 3/2006 |
| JP | 2006077639 A * | 3/2006 |
| WO | WO 02/056400 A2 | 7/2002 |

OTHER PUBLICATIONS

H. Ishida et al., "A Cycle Study on the Inert Gas Circulating Hz Diesel" (1995).

H. Ishida et al., "A Study on the Inert Gas Circulating Hydrogen Diesel System" (1997).

"Development of Clean Hydrogen Engine" (2001).

* cited by examiner

HYDROGEN ENGINE USING A RECIRCULATING WORKING MEDIUM

TECHNICAL FIELD

The present invention relates to a hydrogen engine using a recirculating working medium, wherein hydrogen, oxygen, and the working medium composed of a monoatomic gas are supplied to a combustion chamber to combust the hydrogen, and the working medium included in an exhaust gas discharged from the combustion chamber is recirculated (or returned, resupplied) to the combustion chamber.

BACKGROUND ART

A hydrogen engine using a recirculating (recirculated) working medium has been proposed, in which hydrogen, oxygen, and gaseous argon composed of a monoatomic gas serving as a working medium are supplied to a combustion chamber to combust the hydrogen, and the working medium included in an exhaust gas discharged from the combustion chamber is recirculated to the combustion chamber through a recirculating passage (refer to, for example, Japanese Patent Application Laid-Open (kokai) No. 11-93681, Claim 1, paragraphs 0021-0029, and FIG. 1). An argon gas is an inert gas having a very high specific heat ratio. Therefore, the conventional hydrogen engine described above can be operated with greater thermal efficiency, as compared to an engine using a working medium whose specific heat ratio is low. The exhaust gas of the above hydrogen engine contains $H_2O$ (steam) and the argon gas. Accordingly, the engine separates/eliminates (or removes) the $H_2O$ from the exhaust gas, and resupplies to the combustion chamber the gas from which the $H_2O$ has been eliminated.

However, the exhaust gas of the engine described above may contain reaction product generated in the combustion chamber other than the $H_2O$ and the argon gas. Examples of such reaction products are carbon dioxide ($CO_2$), nitrogen oxide (NOx), hydrocarbon (HC), and the like. For instance, carbon dioxide is produced when engine lubricant oil is burnt (or chemically altered) in the combustion chamber. More specifically, when a part of the engine lubricant oil staying on a cylinder liner is burnt or when the engine lubricant oil which leaks through oil seal sections of intake valves or of exhaust valves into the combustion chamber is burnt, carbon dioxide is inevitably contained in the exhaust gas.

Incidentally, carbon dioxide is composed of three atoms. The products (the nitrogen oxide, the hydrocarbon, etc.), including the carbon dioxide, produced in the combustion chamber are gases, each of which is composed of two or more atoms. Hereinafter, for convenience sake, the gas composed of two or more atoms is referred to as a "plural atoms gas". A specific heat ratio of the plural atoms gas is smaller than the specific heat ratio of the monoatomic gas. Therefore, the thermal efficiency of the engine becomes lower as "a concentration of the products formed in the combustion chamber" in the recirculating gas becomes higher.

DISCLOSURE OF THE INVENTION

A hydrogen engine according to the present invention for solving the problem in the thermal efficiency described above is a hydrogen engine using a recirculating working medium. The engine supplies hydrogen, oxygen, and a working medium composed of a monoatomic gas to a combustion chamber to combust the hydrogen, and recirculates (or resupplies, returns) the working medium included in an exhaust gas discharged from the combustion chamber to the combustion chamber through a recirculating passage. The engine further comprises product eliminating means disposed in the recirculating passage for eliminating product produced (or generated, formed) in the combustion chamber other than $H_2O$ (steam).

Generally, a monoatomic gas has a large specific heat ratio. To the contrary, each of the products generated in the combustion chamber other than $H_2O$ generally has specific heat ratio smaller than the specific heat ratio of the monoatomic gas, because the products are plural atoms gases. Therefore, the hydrogen engine as configured above can be operated with high thermal efficiency constantly, because the product generated in the combustion chamber other than $H_2O$ (i.e., the product having the specific heat ratio smaller than the specific heat ratio of the working medium) is eliminated from the recirculating gas by the product eliminating means.

In this case, it is preferable that the product eliminating means be configured so as to eliminate carbon dioxide which is the product produced in the combustion chamber other than $H_2O$.

Generally, a lubricant oil is used for an engine. Thus, carbon dioxide having a relatively low specific heat ratio is inevitably produced in the combustion chamber as explained above. Accordingly, the hydrogen engine can be operated with high thermal efficiency constantly by eliminating the carbon dioxide from the recirculating gas by using the configuration described above.

In this case, it is preferable that the product eliminating means for eliminating the carbon dioxide comprise, a container having a passage which constitute a portion of the recirculating passage; and a monoethanolamine solution contained in the passage of the container or a zeolitic absorbent contained in the passage of the container.

A monoethanolamine (MEA) solution can dissolve carbon dioxide with high solubility. A zeolitic absorbent can absorb carbon dioxide with high efficiency. Therefore, the carbon dioxide included in the recirculating gas can be absorbed and separated/eliminated from the recirculating gas efficiently by making the exhaust gas flow through the passage containing one of these materials, according to the configuration described above.

It is also preferable that, the recirculating passage comprise a main passage and a bypass passage which branches from the main passage at a branch point and joins to the main passage at a joining point downstream of the branch point;

the product eliminating means be disposed in the bypass passage; and the hydrogen engine comprise a path switching means for selecting either a first state in which the gas flowing through the main passage upstream of the branch point is made to flow through the main passage between the branch point and the joining point or a second state in which the gas flowing through the main passage upstream of the branch point is made to flow through the bypass passage between the branch point and the joining point.

According to the above configuration, when a path through which the recirculating gas flows between the branch point and the joining point is selected to be the bypass passage by the path switching means as need arises, the product included in the recirculating gas is eliminated by the product eliminating means disposed in the bypass passage. As a result, the concentration of the product in the recirculating gas can be decreased. On the other hand, when the path through which the recirculating gas flows between the branch point and the joining point is selected to be the main passage by the path switching means, the recirculating gas does not flow through the product eliminating means. As a result, because the recirculating gas does not flow through the bypass passage and the product eliminating means having high passage-resistances to flow, the decrease in the engine efficiency can be avoided.

Further, it is preferable that, in the present hydrogen engine, the product eliminating means comprise, an absorbing material for absorbing the product;

enhancing separation means for adding physical action to the absorbing material in such a manner that the product absorbed by the absorbing material is enhanced to separate from the absorbing material; and a discharging opening section for discharging the product which is separated from the absorbing material to outside of the recirculating passage.

According to the above configuration, the product absorbed by the absorbing material is enhanced to separate from the absorbing material by the enhancing separation means. Therefore, the absorbing material can restore its ability for absorbing the product. As a result, the absorbing material can be used for a long period without replacing the absorbing material by a new absorbing material.

It is preferable that, in the hydrogen engine having the enhancing separation means, the absorbing material be either a monoethanolamine solution which absorbs carbon dioxide as the product by dissolving the carbon dioxide or a zeolitic absorbent which absorbs the carbon dioxide by sorbing the carbon dioxide; and the enhancing separation means be a heating means for heating the absorbing material.

A monoethanolamine solution has characteristics that its solubility for carbon dioxide sharply decreases as its temperature increases. A zeolitic absorbent has characteristics that its absorption efficiency for carbon dioxide sharply decreases as its temperature increases. Therefore, according to the above configuration, it is possible to easily separate (or eliminate) the carbon dioxide, which has been absorbed by (dissolved in or sorbed in) the monoethanolamine solution or the zeolitic absorbent, from the monoethanolamine solution or the zeolitic absorbent by heating them with the heating means. As a result, it is possible to restore the ability of the monoethanolamine solution and the zeolitic absorbent for absorbing carbon dioxide.

It is also preferable that the hydrogen engine having the bypass passage in which the product eliminating means are disposed and the path switching means for selecting either the main passage or the bypass passage as the path through which the recirculating gas flows comprise, carbon dioxide concentration obtaining means for obtaining a concentration of carbon dioxide contained in gas flowing through the main passage (for instance, the main passage at a position upstream of the branch point or the main passage at a position downstream of the joining point); and switching control means for switching over the path switching means in such a manner that the gas flowing through the main passage upstream of the branch point is made to flow through the bypass passage between the branch point and the joining point, when the obtained concentration of carbon dioxide is higher than a predetermined concentration.

With the configuration above, the recirculating gas flows through the bypass passage when the obtained concentration of carbon dioxide becomes higher than the predetermined concentration, i.e., when the thermal efficiency of the engine has decreased to an unacceptable level. Thus, because the carbon dioxide is eliminated from the recirculating gas by the product eliminating means, the decrease in the engine efficiency can be avoided. Further, because the recirculating gas does not flow through the bypass passage and the product eliminating means having high passage-resistances to flow unless it is necessary, the decrease in the engine efficiency can be avoided.

In this case, the carbon dioxide concentration obtaining means may be a carbon dioxide concentration sensor which detects (or measures) the carbon dioxide concentration, or may be carbon dioxide concentration estimating means for estimating the carbon dioxide concentration based on accumulated time period of operation of the hydrogen engine (or a total time in which the engine is operated). If the carbon dioxide concentration is estimated based on the accumulated time period of operation of the hydrogen engine, the engine cost will be lowered, because it is not necessary to adopt the expensive carbon dioxide concentration sensor.

The present hydrogen engine may comprise, cylinder pressure obtaining means for obtaining a cylinder pressure which is a pressure in the combustion chamber when a crank angle of the engine coincides with a predetermined crank angle near a top dead center of a compression stroke; and switching control means for switching over the path switching means in such a manner that the gas flowing through the main passage upstream of the branch point is made to flow through the bypass passage between the branch point and the joining point, when the obtained cylinder pressure is smaller than a predetermined pressure.

As mentioned above, carbon dioxide gas is composed of three atoms, and thus, its specific heat ratio is smaller than the specific heat ratio of the working medium composed of the monoatomic gas. Therefore, the cylinder pressure near the top dead center of the compression stroke becomes smaller as the concentration of the carbon dioxide in the recirculating gas becomes higher. Thus, a fact that the cylinder pressure when the crank angle of the engine coincides with the predetermined crank angle near the top dead center of the compression stroke becomes smaller than the predetermined pressure means that the concentration of carbon dioxide in the recirculating gas becomes higher. In view of this, according to the configuration above, the path through which the recirculating gas flows is selected in such a manner that the recirculating gas flows through the bypass passage, when the cylinder pressure at the predetermined crank angle near the top dead center of the compression stroke becomes smaller than the predetermined pressure. Thus, because the carbon dioxide is eliminated from the recirculating gas by the product eliminating means, the decrease in the engine efficiency can be avoided. Further, because the recirculating gas does not flow through the bypass passage (absorbing carbon dioxide mechanism) having high passage-resistances to flow unless it is necessary, the decrease in the engine efficiency can be avoided.

Alternatively, the present hydrogen engine may comprise, combustion state indicating value obtaining means for obtaining a combustion state indicating value indicative of combustion state in the engine; and switching control means for switching over the path switching means in such a manner that the gas flowing through the main passage upstream of the branch point is made to flow through the bypass passage between the branch point and the joining point, when the obtained combustion state indicating value indicates that the combustion state is worse than predetermined combustion state.

As mentioned above, carbon dioxide gas is composed of three atoms, and thus, its specific heat ratio is smaller than the specific heat ratio of the working medium composed of a monoatomic gas.

Therefore, if the hydrogen engine is a type of an engine in which hydrogen is injected into high temperature and high pressure gas for diffusion combustion, a combustion speed (rate) becomes lower as the concentration of the carbon dioxide becomes higher, and accordingly, fluctuation in the combustion state between successive cycles becomes large, or a self-ignition timing delays. Thus, if a fluctuation rate of an indicated mean effective pressure, a self-ignition timing, or a fluctuation rate of self-ignition timings is used as the combustion state indicating value, it is possible to determine whether or not the concentration of carbon dioxide becomes higher than an acceptable concentration based on the combustion state indicating value.

Further, if the hydrogen engine is a type of an engine in which hydrogen is combusted by flame propagating using spark ignition, a flame propagation speed becomes lower as the concentration of the carbon dioxide becomes higher, and accordingly, the cylinder pressure during a combustion stroke (or an expansion stroke) changes more gradually. Thus, if a change rate of the cylinder pressure is used as the combustion state indicating value, it is possible to determine whether or not the concentration of carbon dioxide becomes higher than the acceptable concentration based on the combustion state indicating value.

Furthermore, regardless of the engine type, the thermal efficiency becomes lower as the concentration of the carbon dioxide becomes higher. Accordingly, if an indicated thermal efficiency is used as the combustion state indicating value, it is possible to determine whether or not the concentration of carbon dioxide becomes higher than the acceptable concentration based on the indicated thermal efficiency. It should be noted that the indicated thermal efficiency can be obtained as a value of ratio (e.g., Q1/Q0) of an indicated work done Q1 obtained based on the cylinder pressure and a volume of the combustion chamber to an energy Q0 supplied to the engine obtained based on an amount of supplied hydrogen (e.g., an injection amount of hydrogen), for instance.

With these views, according to the configuration above, if the path switching means is switched over to select the path by which the gas flowing through the main passage upstream of the branch point is made to flow through the bypass passage between the branch point and the joining point when the combustion state indicating value indicates that the combustion state is worse than the predetermined combustion state, it can be avoided for the concentration of carbon dioxide to increase excessively, and thus, the decrease in the engine efficiency can be avoided. Further, because the recirculating gas does not flow through the bypass passage and the product eliminating means having high passage-resistances to flow unless it is necessary, the decrease in the engine efficiency can be avoided.

BEST MODE FOR CARRYING OUT THE INVENTION

Embodiments of a hydrogen engine (multi-cylinder engine) using a recirculating working medium according to the present invention will be described with reference to the drawings.

First Embodiment

Figure 1:
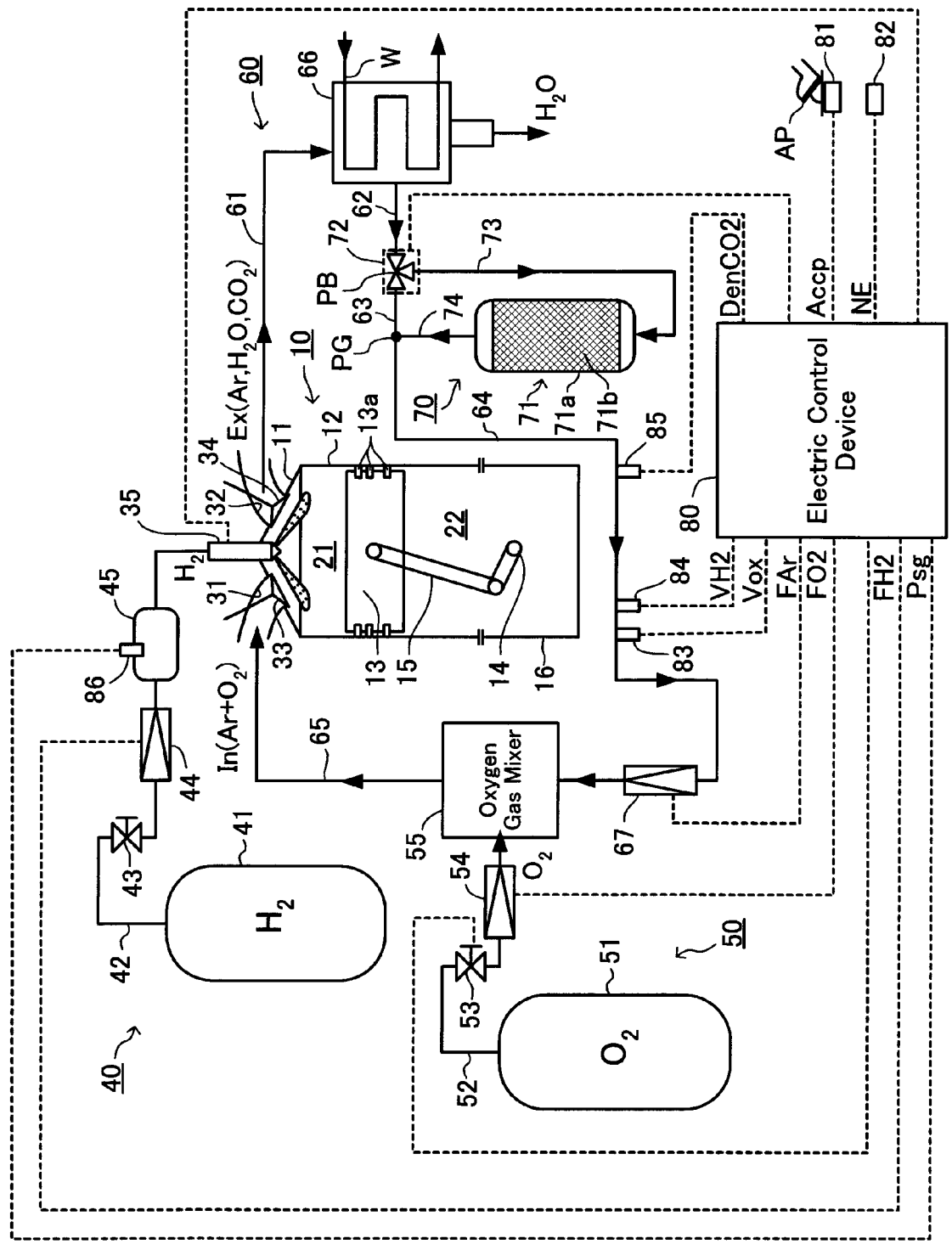
FIG. 1 is a schematic configuration of a system including a hydrogen engine using a recirculating working medium of a first embodiment according to the present invention.

FIG. 1 shows a schematic configuration of a system including a hydrogen engine using a recirculating working medium of a first embodiment according to the present invention.

The system comprises the hydrogen engine 10 using the recirculating working medium, a hydrogen supplying section 40, an oxygen supplying section 50, a working medium recirculating passage section 60, a product eliminating section 70, and an electric control device 80. The hydrogen engine 10 is an engine of a type which supplies an oxygen gas and an argon gas serving as a working medium to a combustion chamber, and injects a hydrogen gas into a high pressure gas obtained by compressing the oxygen gas and the argon gas for diffusion combustion of the hydrogen. It should be noted that FIG. 1 shows a cross sectional view of a specific cylinder of the hydrogen engine 10, however, the other cylinder has the same configuration.

The hydrogen engine 10 is a reciprocating internal combustion engine. The hydrogen engine 10 includes a cylinder head 11 constituted by a cylinder head section, a cylinder 12 constituted by a cylinder block section, a piston 13 reciprocating within the cylinder 12, a crankshaft 14, a connecting rod 15 connecting between the piston 13 and the crankshaft 14 for converting the reciprocating motion of the piston 13 into a rotating motion of the crankshaft 14, and an oil pan 16 connected to a cylinder block. Piston rings 13a are disposed on the side surface of the piston 13.

A space formed by the cylinder head 11, the cylinder 12, and the oil pan 16 is divided by the piston 13 into a combustion chamber 21 located at a head side of the piston 13 and a crank case 22 which holds the crankshaft 14.

An intake port 31 communicating with the combustion chamber 21 and an exhaust port 32 communicating with the combustion chamber 25 are provided in the cylinder head 11. An intake valve 33 for opening and closing the intake port 31 is provided in the intake port 31. An exhaust valve 34 for opening and closing the exhaust port 32 is provided in the exhaust port 32. A hydrogen injection valve (injector) 35 which injects hydrogen (a hydrogen gas) directly into the combustion chamber 21 is disposed at the cylinder head 11.

The hydrogen supplying section 40 comprises a hydrogen tank (a hydrogen gas tank) 41, a hydrogen gas passage 42, a hydrogen gas pressure regulator 43, a hydrogen gas flowmeter 44, and a surge tank 45.

The hydrogen tank 41 stores a hydrogen gas serving as a fuel under high pressure of 10 to 70 MPa. The hydrogen gas passage 42 is a passage (conduit, pipe) which communicates the hydrogen tank 41 with the hydrogen injection valve 35. The hydrogen gas pressure regulator 43, the hydrogen gas flowmeter 44, and the surge tank 45 are disposed along the hydrogen gas passage 42 in this order from the hydrogen tank 41 to the hydrogen injection valve 35.

The hydrogen gas pressure regulator 43 is a well known pressure regulator and adjusts a pressure at a position downstream of the hydrogen gas pressure regulator 43 (i.e., at a side of the surge tank 45) in the hydrogen passage 42 so as to maintain the pressure at a constant pressure. The hydrogen gas flowmeter 44 measures an amount of the hydrogen gas flowing through the hydrogen passage 42 (i.e., a hydrogen gas flow rate) to output a signal indicative of the hydrogen gas flow rate FH2. The surge tank 45 is adapted to suppress pulsation which occurs in the hydrogen passage 42 when the hydrogen gas is injected.

The oxygen supplying section 50 comprises an oxygen tank (an oxygen gas tank) 51, an oxygen gas passage 52, an oxygen gas pressure regulator 53, an oxygen gas flowmeter 54, and an oxygen gas mixer 55.

The oxygen tank 51 stores an oxygen gas under an appropriate pressure. The oxygen gas passage 52 is a passage (conduit, pipe) which communicates the oxygen tank 51 with the oxygen gas mixer 55. The oxygen gas pressure regulator 53 and the oxygen gas flowmeter 54 are disposed along the oxygen gas passage 52 in this order from the oxygen tank 51 to the oxygen gas mixer 55.

The oxygen gas pressure regulator 53 is a well known adjustable pressure regulator which can control a pressure. That is, the oxygen gas pressure regulator 53 adjusts a pressure at a position downstream of the oxygen gas pressure regulator 53 (i.e., at a side of the oxygen gas mixer 55) in the oxygen passage 52 so as to make the pressure coincide with a target adjustable pressure RO2tgt in accordance with an instruction signal. In other words, the oxygen gas pressure regulator 53 can control a flow rate of the oxygen gas flowing through the oxygen passage 52 in response to the instruction signal.

The oxygen gas flowmeter 54 measures an amount of the oxygen gas flowing through the oxygen passage 52 (i.e., an oxygen gas flow rate) to output a signal indicative of the oxygen gas flow rate FO2. The oxygen gas mixer 55 is disposed (interposed) in a fifth passage 65 of the recirculating gas passage section 60 described later. The oxygen gas mixer 55 mixes the oxygen supplied to the oxygen gas mixer 55 through the oxygen passage 52 with a gas supplied to an inlet section of the oxygen gas mixer 55 through the fifth passage 65 to thereby discharge the mixed gas from an outlet section of the oxygen gas mixer 55.

The recirculating gas passage section 60 comprises first to fifth passages (first to fifth flow passage conduits) 61-65, a condenser (or a steam condenser, a gas-liquid water separator) 66, and an argon gas flowmeter 67.

The first passage 61 connects the exhaust port 32 with an inlet section of the condenser 66. The second passage 62 connects an outlet section of the condenser 66 with an inlet section of a three-way valve (a switching means for switching a path) 72 described later. The third passage 63 connects one of outlet sections of the three-way valve 72 with a joining point PG described later. The fourth passage 64 connects the joining point PG with an inlet section of the argon gas flowmeter 67. The fifth passage 65 connects an outlet section of the argon gas flowmeter 67 with the intake port 31. The oxygen gas mixer 55 is interposed in the fifth passage 65.

The condenser 66 is configured in such a manner that it introduces an exhausted gas discharged from the combustion chamber 21 through the first passage 61 and the inlet section of the condenser 66. The condenser 66 condenses/devolatilizes water vapor (or steam, $H_2O$) contained in the exhaust gas by cooling the exhaust gas introduced from the inlet section with a cooling water W. Thus, the condenser 66 changes the water vapor contained in the exhaust gas into liquid water by separating the water vapor from noncondensable gas so as to discharge the liquid water outside. In addition, the condenser 66 supplies the separated noncondensable gas to the second passage 62 through its outlet section.

The argon gas flowmeter 67 measures an amount of the argon gas flowing through the fourth passage 64 and the fifth passage 65 (i.e., an argon gas flow rate) to output a signal indicative of the argon gas flow rate FAr.

The product eliminating section 70 comprises a carbon dioxide absorbing unit ($CO_2$ absorbing unit) 71, the three-way valve (the switching means for switching a path) 72, a bypass upstream passage 73, and a bypass downstream passage 74.

The carbon dioxide absorbing unit 71 comprises a container 71a and a monoethanolamine solution 71b. The container 71a is a case forming a hollow circular cylinder or a hollow rectangular parallelepiped to have a passage in its inside. The container 71a accommodates (or stores, contains) the monoethanolamine solution 71b within the passage. The monoethanolamine solution is referred to as a "MEA solution". The monoethanolamine solution can absorb carbon dioxide efficiently by dissolving a large amount of carbon dioxide selectively. The container 71a has the inlet section at the bottom and the outlet section at the top. The container 71a is removably (detachably) mounted onto (fixed to) a vehicle having the hydrogen engine 10.

The three-way valve 72 has one inlet section and two outlet sections. The three-way valve 72 communicates (connects communicatively) the one inlet section with either one of the two outlet sections in response to a drive signal (an instruction signal). As described above, the inlet section of the three-way valve 72 is connected with the outlet section of the condenser 66 via the second passage 62. One of outlet sections of the three-way valve 72 is connected with the inlet section of the container 71a via the bypass upstream passage 73. The other one of outlet sections of the three-way valve 72 is connected with the third passage 63 (and with the fourth passage at the joining point PG). One end of the bypass downstream passage 74 is connected with the outlet section of the container 71a. The other end of the bypass downstream passage 74 is connected with the fourth passage 64 (i.e., with the joining point PG).

It should be noted that, for the sake of convenience, a position at which the three-way valve 72 is disposed is referred to as the "branch point PB" of a "main passage comprising the second passage 62, the third passage 63, and the fourth passage 64 (in actuality, further including the first passage 61 and the fifth passage 65)" and "a bypass passage constituted by the bypass upstream passage 73, the bypass downstream passage 74, and the passage formed in the container 71a". In addition, as mentioned above, the position at which the fourth passage 64 is connected with the bypass downstream passage 74 is referred to as the "joining point PG". The "main passage" constitutes the recirculating passage of the working medium. The "bypass passage" constitutes a part of the recirculating passage of the working medium.

The electric control device 80 is an electronic device having a well known microcomputer as a main component, which includes a CPU, a ROM, a RAM, and an interface. The electric control device 80 is connected with the hydrogen gas flowmeter 44, the oxygen gas flowmeter 54, the argon gas flowmeter 67, an accelerator pedal stroke sensor 81, an engine rotation speed sensor 82, an oxygen concentration sensor 83, a hydrogen concentration sensor 84, a carbon dioxide concentration sensor 85, and a surge tank pressure sensor 86. The electric control device 80 inputs measured (detected) signals from them.

The accelerator pedal stroke sensor 81 detects a stroke of an accelerator pedal AP to output a signal Accp indicative of the accelerator pedal stroke. The engine rotation speed sensor 82 outputs a signal indicative of an engine rotation speed NE and a crank angle based on a rotation speed of the crankshaft 14.

The oxygen concentration sensor 83, the hydrogen concentration sensor 84, and the carbon dioxide concentration sensor 85 are disposed in the fourth passage 64 (between the joining point PG and the argon gas flowmeter 67). The oxygen concentration sensor 83 detects a concentration of oxygen in the gas flowing at the disposed position of the oxygen concentration sensor 83 (the fourth passage 64) to output a signal Vox indicative of the concentration of the oxygen. The hydrogen concentration sensor 84 detects a concentration of hydrogen in the gas flowing at the disposed position of the hydrogen concentration sensor 84 (the fourth passage 64) to output a signal VH2 indicative of the concentration of the hydrogen.

The carbon dioxide concentration sensor 85 detects a concentration of carbon dioxide in the gas flowing at the disposed position of the carbon dioxide concentration sensor 85 (the fourth passage 64) to output a signal DenCO2 indicative of the concentration of the carbon dioxide. The surge tank pressure sensor 86 detects a pressure of hydrogen gas in the surge tank 45 to output a signal Psg indicative of the pressure in the surge tank (i.e., a surge tank pressure which is a pressured of an injected hydrogen gas).

Further, the electric control device 80 is connected with the hydrogen injection valve 35 of each of the cylinders, the oxygen gas pressure regulator 53, and the three-way valve 72, and sends instruction signals or drive signals to them.

Next, operation of the system including the hydrogen engine 10 using the recirculating working medium will be described with reference to FIGS. 2 to 4.

Figure 2:
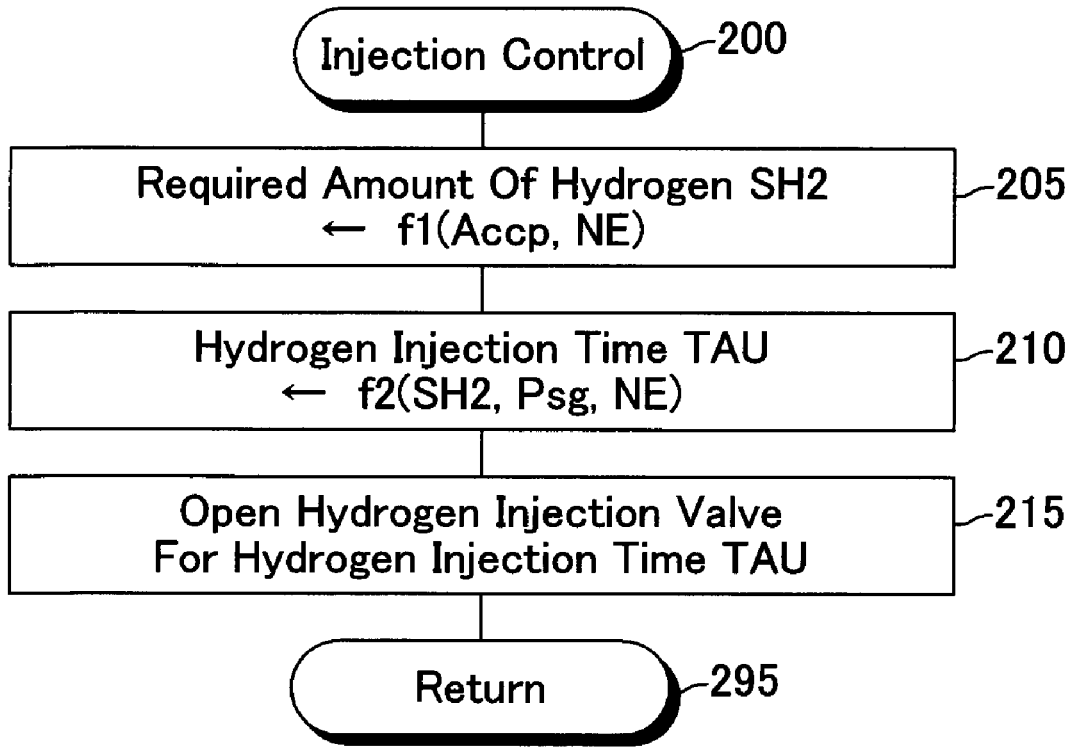
FIG. 2 is a routine, shown by a flowchart, which a CPU of the electric control device shown in FIG. 1 executes.

The CPU of the electric control device 80 executes an injection control routine shown by a flowchart in FIG. 2 every time the crank angle of the engine 10 coincides with a predetermined crank angle (for instance, 90° before top dead center of a compression stroke of each cylinder). Thus, when the crank angle of the engine 10 coincides with the predetermined crank angle, the CPU starts processing of the present routine from Step 200 and proceeds to Step 205 to determine (obtain) a required amount of hydrogen SH2 based on the accelerator pedal stroke Accp (engine load) detected at a present timing, the engine rotation speed NE detected at the present timing, and a function f1. The function f1 is a predetermined function (for instance, a look-up table) for obtaining the required amount of hydrogen SH2 in response to a required torque which is determined based on the accelerator pedal stroke Accp and the engine rotation speed NE.

Next, the CPU proceeds to Step 210 to convert the required amount of hydrogen SH2 into a hydrogen injection time (duration) TAU for which the hydrogen injection valve 35 is being opened, based on the required amount of hydrogen SH2, the surge tank pressure Psg detected at the present timing, the engine rotation speed NE detected at the present timing, and a predetermined function (for instance, a look-up table) f2. Thereafter, the CPU proceeds to Step 215 to send to the hydrogen injection valve 35 the drive signal to open, for the hydrogen injection time TAU, the hydrogen injection valve 35 for the cylinder whose crank angle reaches the 90° before the top dead center of the compression stroke. Then, the CPU proceeds to Step 295 to end the present routine tentatively. With the operation above, the hydrogen is supplied to the combustion chamber 21 by an amount necessary for outputting the required torque.

Figure 3:
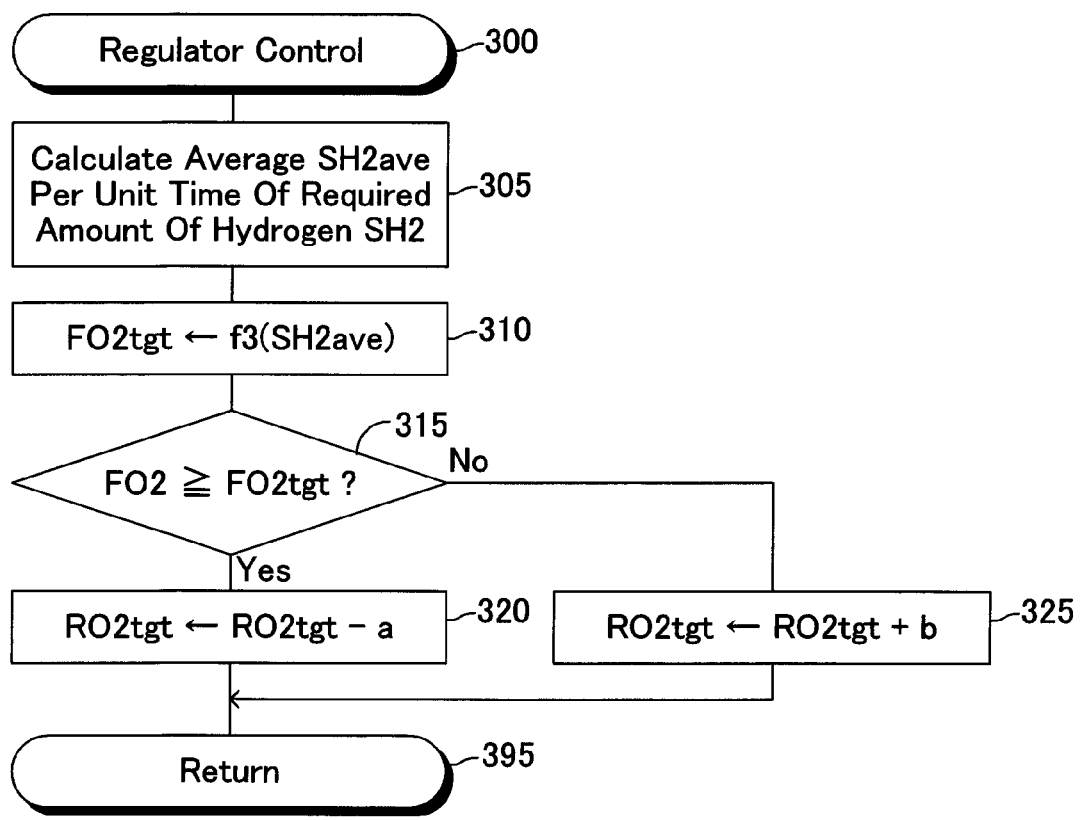
FIG. 3 is a routine, shown by a flowchart, which the CPU of the electric control device shown in FIG. 1 executes.

Further, the CPU executes a regulator control routine shown by a flowchart in FIG. 3 every time a predetermined time elapses. Thus, the CPU starts processing the present routine from Step 300 at an appropriate timing to proceed to 305 in which the CPU calculates an average SH2ave per unit time of the required amount of hydrogen SH2 at the present timing. This calculation is carried out by summing the required amount of hydrogen SH2 obtained in Step 205 in FIG. 2 described above for the unit time. Subsequently, the CPU proceeds to Step 310 to obtain a target oxygen flow rate FO2tgt based on the thus obtained average SH2ave and a predetermined function (for instance, a look-up table) f3.

As described above, the engine 10 combust hydrogen as a fuel. Therefore, 1 mole of oxygen should be supplied for 2 mole of hydrogen in order to generate water only by the combustion of the hydrogen. Accordingly, the function f3 is configured to determine the target oxygen flow rate FO2tgt in such a manner a half mole of oxygen of the mole of hydrogen represented by the average SH2ave (in actuality, an amount of oxygen corresponding to a sum of the same mole of oxygen and a margin) is supplied to the combustion chamber 21.

Next, the CPU proceeds to Step 315 to determine whether or not the oxygen gas flow rate FO2 detected at the present timing is equal to or larger than the target oxygen flow rate FO2tgt. When the CPU determines that the oxygen gas flow rate F02 detected at the present timing is equal to or larger than the target oxygen flow rate FO2tgt, the CPU proceeds to Step 320 to decrease the target adjustable pressure RO2tgt for the oxygen gas pressure regulator 53 by a positive constant value "a". As a result, the amount of the oxygen supplied to the oxygen gas mixer 55 is decreased.

On the other hand, when the CPU determines, in Step 315, that the oxygen gas flow rate F02 detected at the present timing is smaller than the target oxygen flow rate FO2tgt, the CPU proceeds to Step 325 to increase the target adjustable pressure RO2tgt for the oxygen gas pressure regulator 53 by a positive constant value "b". As a result, the amount of the oxygen supplied to the oxygen gas mixer 55 is increased. Accordingly, a necessary and sufficient amount of oxygen is supplied to the combustion chamber 21 via the oxygen gas mixer 55. Thereafter, the CPU proceeds to Step 395 to end the present routine tentatively.

Figure 4:
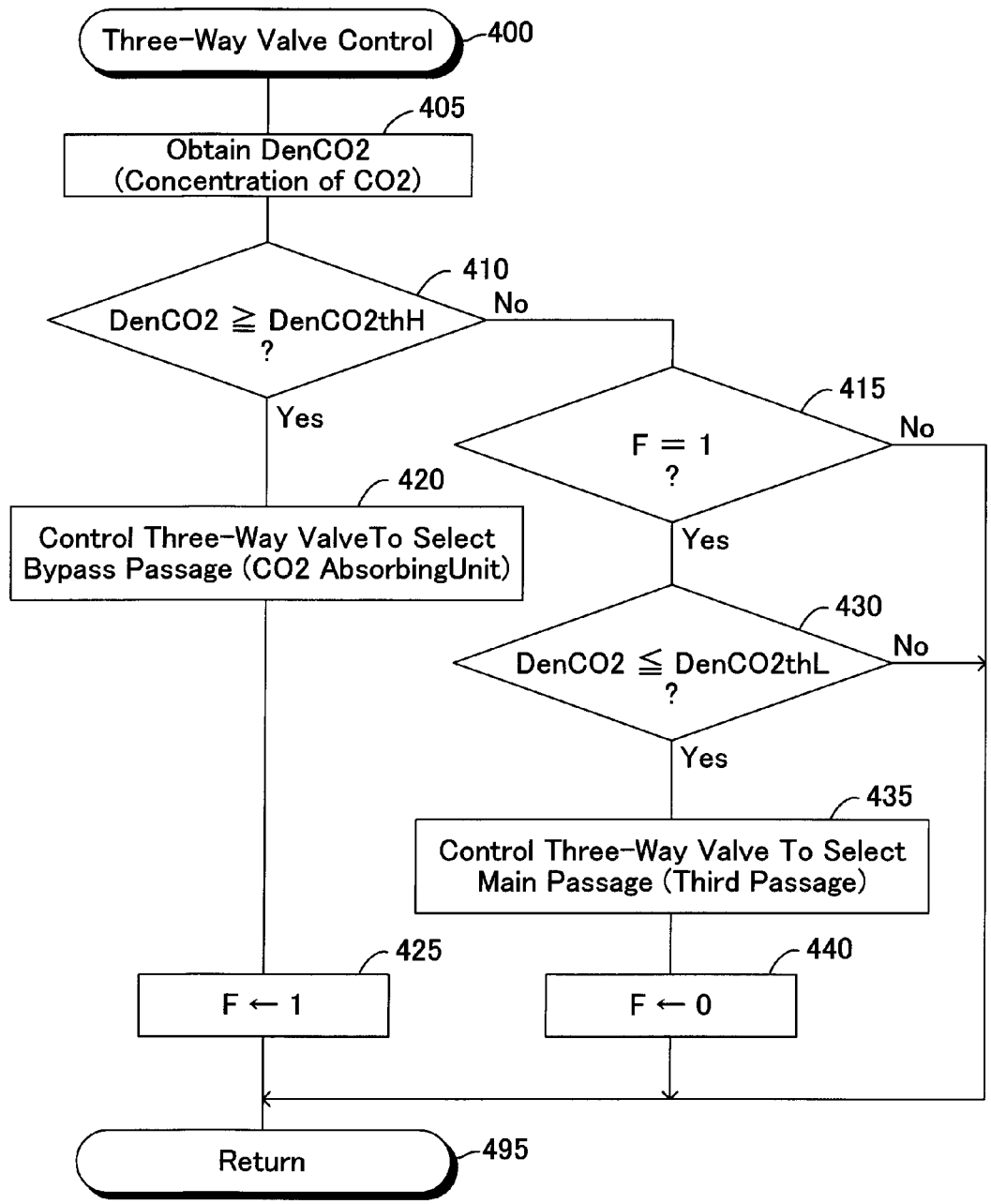
FIG. 4 is a routine, shown by a flowchart, which the CPU of the electric control device shown in FIG. 1 executes.

Further, the CPU executes a three-way valve control routine (a path switching control routine, or a control routine for switching a path) shown by a flowchart in FIG. 4 every time a predetermined time elapses. Firstly, a description will be made about a state where the concentration DenCO2 of the carbon dioxide of the recirculating gas flowing through the recirculating passage (the concentration DenCO2 of the carbon dioxide of the recirculating gas flowing through the main passage constituted by the first to the fifth passages 61-65, particularly, the recirculating gas flowing through the second passage 62 constituting a part of the main passage upstream of the branch point PB or the recirculating gas flowing through the fourth passage 64 constituting a part of the main passage downstream of the joining point PG) is lower than a predetermined high concentration (a high threshold, a predetermined value) DenCO2thH, and the separation/elimination of the carbon dioxide by use of the carbon dioxide absorbing unit 71 is not being carried out. It should be noted that the predetermined high concentration DenCO2thH is set at a concentration of carbon dioxide that may cause a problem of the decrease in the thermal efficiency of the hydrogen engine 10 due to the carbon dioxide excessively included in the recirculating gas.

The CPU starts processing the routine shown in FIG. 4 from Step 400 at an appropriate timing to proceed to 405 in which the CPU obtains the concentration DenCO2 of the carbon dioxide from the carbon dioxide concentration sensor 85. Next, the CPU proceeds to Step 410 to determine whether or not the concentration DenCO2 of the carbon dioxide is equal to or higher than the predetermined high concentration DenCO2thH.

According to the assumption described above, the concentration DenCO2 of the carbon dioxide is lower than the predetermined high concentration DenCO2thH. Thus, the CPU makes a determination of "No" in Step 410 and then proceeds to Step 415 in which the CPU determines whether or not a value of a carbon dioxide separation performing flag F is "1". As described later, the value of the carbon dioxide separation performing flag F is set to "1" when the separation/elimination of the carbon dioxide by use of the carbon dioxide absorbing unit 71 is being carried out. The value of the carbon dioxide separation performing flag F is set to "0" by an initial routine (not shown) which is executed when an ignition key switch is turned on from its off state.

According to the assumption described above, the separation/elimination of the carbon dioxide by use of the carbon dioxide absorbing unit 71 is not being carried out. Thus, the value of the carbon dioxide separation performing flag F is "0", and therefore, the CPU makes a determination of "No" in Step 415 to proceeds to Step 495 to end the present routine tentatively. As a result, the exhausted gas discharged from the combustion chamber 21 (the recirculating gas) is recirculated through the main passage composed of the first passage 61, the second passage 62, the third passage 63, the fourth passage 64, and the fifth passage 65. In other words, the exhausted gas discharged from the combustion chamber 21 does not flow through the carbon dioxide absorbing unit 71.

Next, a description will be made about a state where the concentration DenCO2 of the carbon dioxide in the main passage becomes higher than the predetermined high concentration DenCO2thH. This state may occur after a part of the engine lubricant oil, which has flowed into the combustion chamber 21 due to oil loss via the piston rings 13a or due to oil loss via valve guides, is burnt in the combustion chamber 21 and thereby the carbon dioxide is generated while the engine 10 is repeating the operation described above.

Under the assumption described above, the CPU makes a determination of "Yes" in Step 410 which is next to Step 405 to proceeds to Step 420 in which the CPU control the three-way valve 72 in such a manner that the inlet section of the three-way valve 72 is changed to be connected (or communicated) with one of the outlet sections of the three-way valve 72 which is connected with the bypass upstream passage 73. In other words, the three-way valve 72 is switched over in such a manner that all gas flowing through the second passage 62 (the gas from which $H_2O$ has been separated and eliminated) flows from the branch point PB to the joining point PG through the bypass passage which interposes the carbon dioxide absorbing unit 71 (the bypass passage composed of the bypass upstream passage 73, the bypass downstream passage 74, and the passage formed in the container 71a of the carbon dioxide absorbing unit 71).

As a result, the recirculating gas flowing through the second passage 62 does not flow through the third passage 63, but flows through the carbon dioxide absorbing unit 71 (through the monoethanolamine solution 71b accommodated within the passage of the carbon dioxide absorbing unit 71). Therefore, the carbon dioxide included in the recirculating gas is absorbed by (or into) the monoethanolamine solution 71b to be separated from the recirculating gas. The recirculating gas from which the carbon dioxide has been separated is supplied to the fourth passage 64 from the joining point PG via the outlet section of the container 71a and the bypass downstream passage 74. Thereafter, the CPU proceeds to Step 425 to set the value of the carbon dioxide separation performing flag F to "1" and proceeds to Step 495 to end the present routine tentatively.

When the state described above continues, the concentration DenCO2 of the carbon dioxide in the main passage decreases gradually, and becomes lower than the predetermined high concentration DenCO2thH and higher than a predetermined low concentration DenCO2thL. The predetermined low concentration DenCO2thL is set to be a value which is lower than the predetermined high concentration DenCO2thH and is equal to a concentration of the carbon dioxide which does not cause the problem of the decrease in the thermal efficiency of the hydrogen engine 10 due to the carbon dioxide included in the recirculating gas.

In this case, the CPU makes a determination of "No" in Step 410 next to Step 405 and makes a determination of "Yes" in Step 415 to thereby proceed to Step 430. In Step 430, the CPU determines whether or not the concentration DenCO2 of the carbon dioxide flowing through the main passage is equal to or lower than the predetermined low concentration DenCO2thL. At this time, the concentration DenCO2 of the carbon dioxide is higher than the predetermined low concentration DenCO2thL. Thus, the CPU makes a determination of "No" in Step 430 to proceed to Step 495 directly to thereby end the present routine tentatively. As a result, the three-way valve 72 is not switched over, and therefore, the recirculating gas flowing through the second passage 62 continues to flow through the carbon dioxide absorbing unit 71. Accordingly, the carbon dioxide included in the recirculating gas is further separated and eliminated from the recirculating gas.

When the state described above further continues, the concentration DenCO2 of the carbon dioxide in the main passage becomes equal to or lower than the predetermined low concentration DenCO2thL. In this case, the CPU makes a determination of "Yes" in Step 430 subsequent to Step 405, Step 410, and Step 415. Then, the CPU proceeds to Step 435 so as to control the three-way valve 72 in such a manner that the inlet section of the three-way valve 72 is changed to be connected (or communicated) with the other one of the outlet sections of the three-way valve 72 which is connected with the third passage 63. In other words, the three-way valve 72 is switched over in such a manner that all gas flowing through the second passage 62 flows through the third passage 63 from the branch point PB to the joining point PG, without flowing through the bypass passage which interposes the carbon dioxide absorbing unit 71. Accordingly, the exhausted gas discharged from the combustion chamber 21 resumes to be recirculated through the main passage composed of the first to the fifth passages 61-65. Thereafter, the CPU sets the value of the carbon dioxide separation performing flag F to "0" in Step 440, and proceeds to Step 495 to end the present routine tentatively.

As is described above, the hydrogen engine 10 using a recirculating working medium of the first embodiment according to the present invention is an engine that supplies hydrogen, oxygen, and a working medium (an argon gas) composed of a monoatomic gas to the combustion chamber 21 to combust the hydrogen, and recirculates the working medium included in the exhaust gas discharged from the combustion chamber 21 to the combustion chamber 21 through a recirculating passage (the main passage and the bypass passage). The engine 10 comprises the product eliminating means (the carbon dioxide absorbing unit 71) disposed in the recirculating passage (the bypass passage) for eliminating the carbon dioxide which is a product generated (or formed) in the combustion chamber 21 other than $H_2O$.

Therefore, the hydrogen engine can be operated with high thermal efficiency constantly, because the product generated in the combustion chamber other than $H_2O$ (i.e., the carbon dioxide which is the product having the specific heat ratio smaller than the specific heat ratio of the argon gas serving as the working medium) is eliminated from the recirculating gas by the product eliminating means.

In addition, the hydrogen engine comprises,
carbon dioxide concentration obtaining means (the carbon dioxide concentration sensor 85) for obtaining the concentration of carbon dioxide contained in the gas flowing through the main passage at the position upstream of the branch point PB (the second passage 62) or through the main passage at the position downstream of the joining point PG (the fourth passage 64); and
switching control means (Step 410 and Step 420, and so on) for switching over the path switching means (the three-way valve 72) in such a manner that the gas flowing through the second passage 62 which is the main passage upstream of the branch point PB is made to flow through the bypass passage between (or from) the branch point PB and (or to) the joining point PG, when the obtained concentration DenCO2 of the carbon dioxide is equal to or higher than the predetermined concentration (the high threshold) DenCO2thH.

Accordingly, it is possible to decrease the concentration of the carbon dioxide included in the recirculating gas. On the other hand, when the path (passage) through which the recirculating gas flows from the branch point PB to the joining point PG is set to the main passage (the third passage 63) by the switching control means, the recirculating gas does not flow through the carbon dioxide absorbing unit 71. As a result, decreasing the hydrogen engine efficiency can be avoided, because the recirculating gas does not flow through the bypass upstream passage 73, the bypass downstream passage 74, and the carbon dioxide absorbing unit 71, having high passage-resistances to flow.

Furthermore, the carbon dioxide absorbing unit 71 is configured in such a manner that it can be mounted detachably onto the vehicle. Thus, it is possible to replace the carbon dioxide absorbing unit 71 when the monoethanolamine solution 71b has absorbed the carbon dioxide sufficiently with a brand new carbon dioxide absorbing unit 71. Alternatively, it is also possible that the carbon dioxide absorbing unit 71 is removed from the vehicle, then the monoethanolamine solution 71b which has absorbed the carbon dioxide sufficiently is replaced with a new monoethanolamine solution 71b or with the monoethanolamine solution 71b from which the dissolved carbon dioxide is separated and eliminated by heating, and thereafter, the carbon dioxide absorbing unit 71 is fixed again to the vehicle.

Modification of the First Embodiment

A modified hydrogen engine using a recirculating working medium of the first embodiment is different from the hydrogen engine of the first embodiment only in that zeolitic absorbent is filled into the carbon dioxide absorbing unit 71 in place of the monoethanolamine solution 71b. The zeolitic absorbent is a solid and can absorb carbon dioxide with high efficiency.

Second Embodiment

Figure 5:
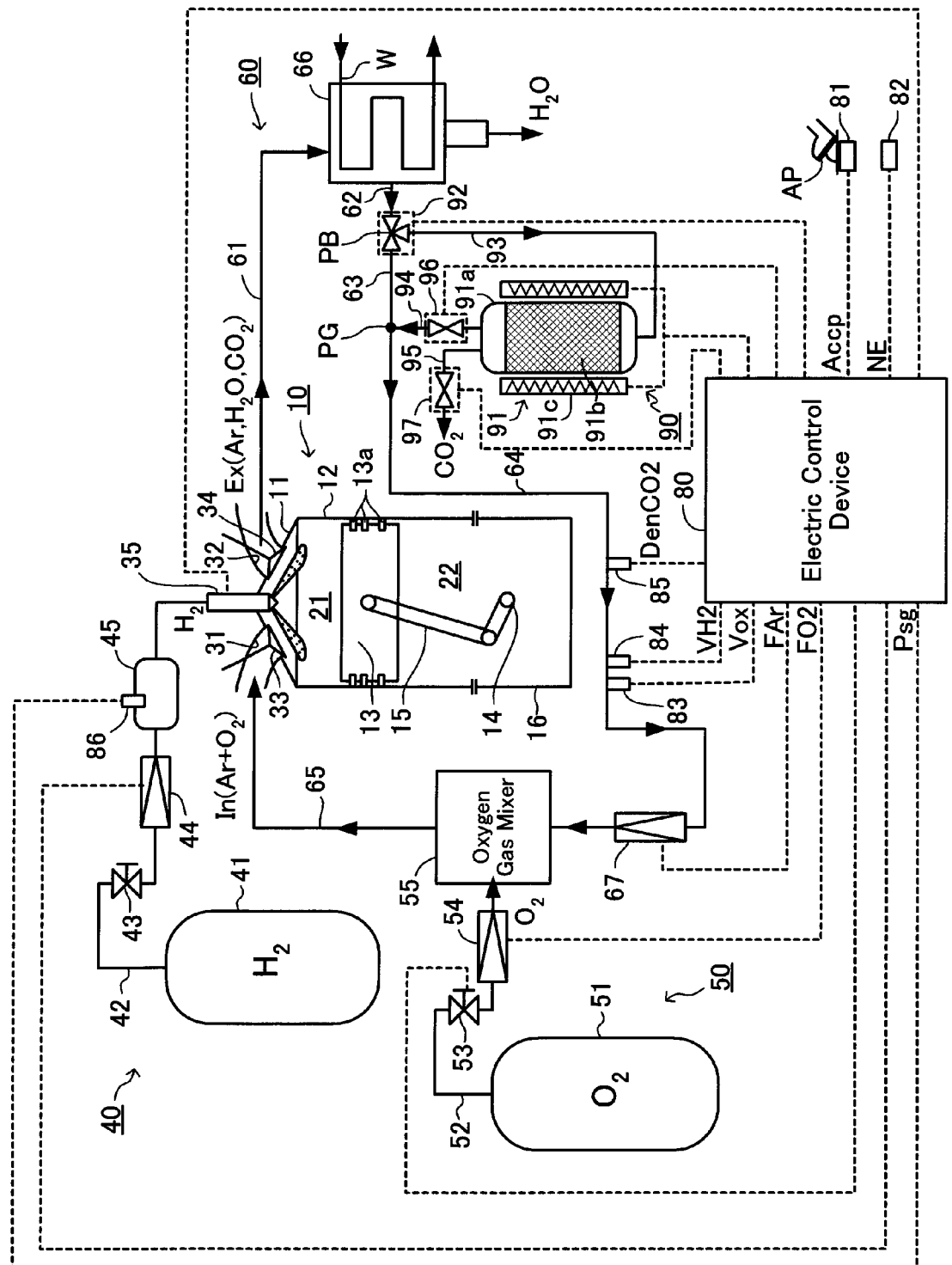
FIG. 5 is a schematic configuration of a system including a hydrogen engine using a recirculating working medium of a second embodiment according to the present invention.

A hydrogen engine using a recirculating working medium of the second embodiment according to the present invention is different from the hydrogen engine of the first embodiment only in that the product eliminating section 70 of the first embodiment is replaced with the product eliminating section 90, as shown in FIG. 5. Therefore, the difference will be mainly described hereinafter.

The product eliminating section 90 comprises a carbon dioxide absorbing unit 91, a three-way valve (path switching means) 92, a bypass upstream passage 93, a bypass downstream passage 94, a carbon dioxide discharging passage 95, a working medium return valve 96, and a discharging valve 97.

The carbon dioxide absorbing unit 91, similarly to the carbon dioxide absorbing unit 71, comprises a container 91a and a monoethanolamine solution 91b. The carbon dioxide absorbing unit 91 further comprises a heater 91c. The container 91a has the same structure as the container 71a, and is removably (detachably) mounted onto (fixed to) the vehicle having the hydrogen engine 10. The container 91a accommodates (contains) the monoethanolamine solution 91b within a passage formed its inside. The heater 91c is disposed (or arranged) around the container 91a and generates heat in response to a drive signal for heating the monoethanolamine solution 91b.

The three-way valve 92, the bypass upstream passage 93, and the bypass downstream passage 94 have the same structure as those of the three-way valve 72, the bypass upstream passage 73, and the bypass downstream passage 74, respectively, and are disposed (arranged) and connected in the same manner as the three-way valve 72, the bypass upstream passage 73, and the bypass downstream passage 74. One end of the carbon dioxide discharging passage 95 is connected with a discharge section (a discharge opening) provided on the top of the container 91a.

The working medium return valve 96 is disposed (or interposed) in the bypass downstream passage 94. The working medium return valve 96 is configured so as to maintain either an opening state in which the bypass downstream passage 94 is opened for communication or a closing state in which the bypass downstream passage 94 is closed in response to a drive signal.

The discharging valve 97 is disposed (or interposed) in the carbon dioxide discharging passage 95. The discharging valve 97 is configured so as to maintain either an opening state in which the carbon dioxide discharging passage 95 is opened for communication or a closing state in which the carbon dioxide discharging passage 95 is closed in response to a drive signal.

Figure 6:
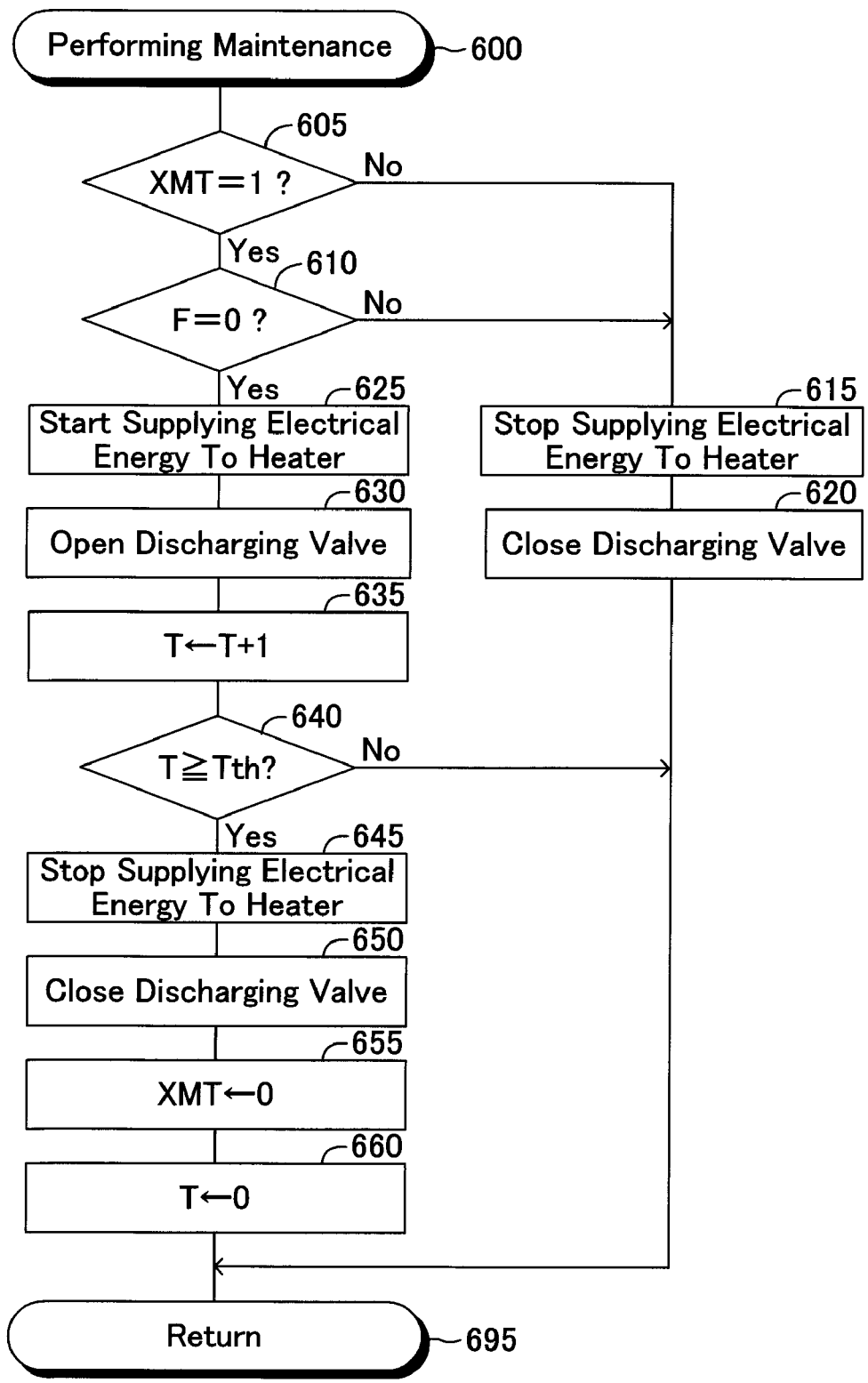
FIG. 6 is a routine, shown by a flowchart, which a CPU of the electric control device shown in FIG. 5 executes.
Figure 7:
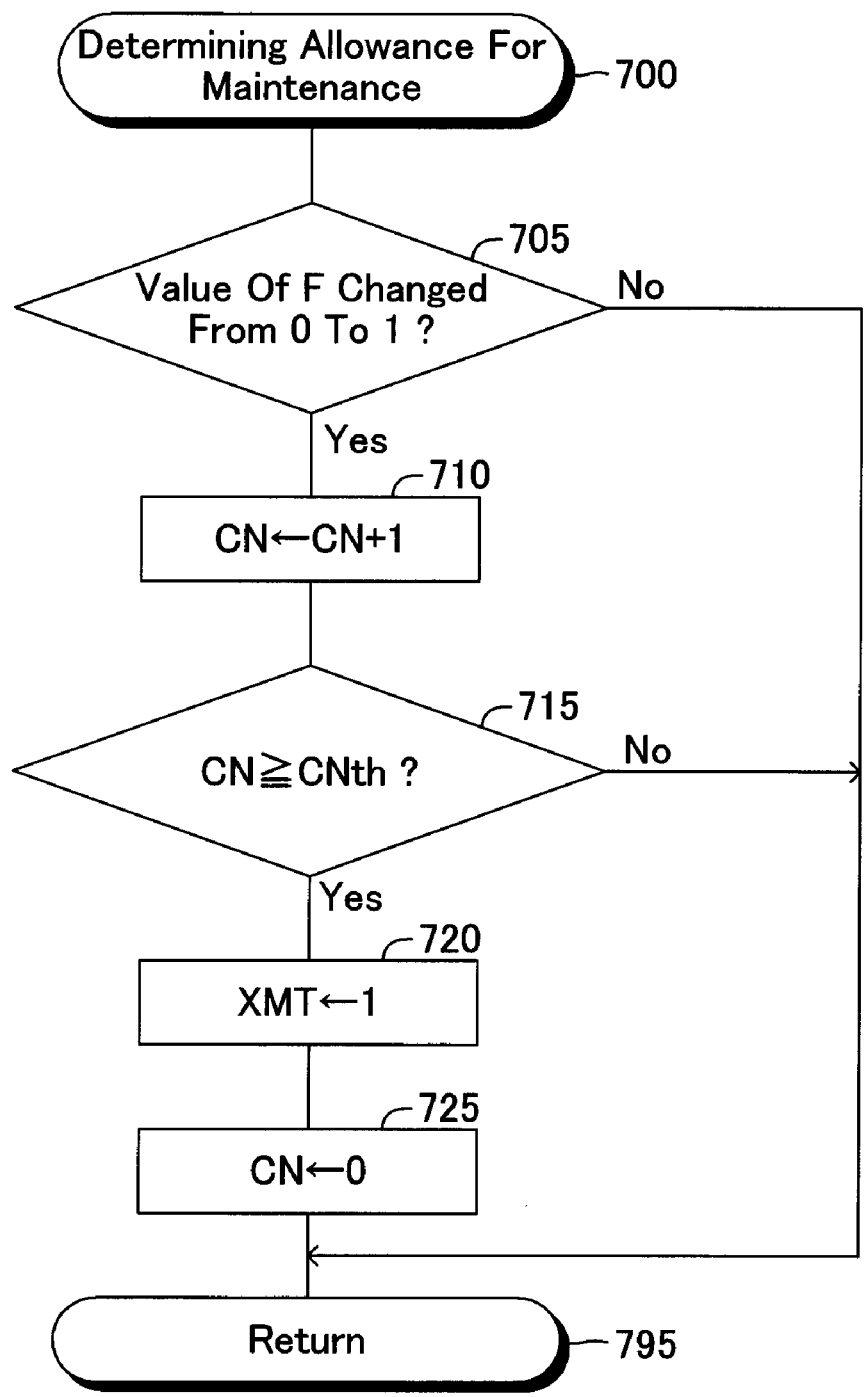
FIG. 7 is a routine, shown by a flowchart, which the CPU of the electric control device shown in FIG. 5 executes.

Next, operation of the system of the second embodiment thus configured will be described. The CPU of the second embodiment executes routines shown in FIGS. 6 and 7 in addition to FIGS. 2 to 4 every time a predetermined every time a predetermined time elapses. FIG. 6 shows the routine for performing a maintenance operation for the carbon dioxide absorbing unit 91. FIG. 7 shows the routine for determining whether or not performing the maintenance operation for the carbon dioxide absorbing unit 91 should be allowed.

It should be noted that, when the CPU of the second embodiment executes processing of Step 420 of FIG. 4, the CPU switches over the three-way valve 92 in such a manner that the inlet section of the three-way valve 92 is changed to be connected (or communicated) with one of the outlet sections of the three-way valve 92 which is connected with the bypass upstream passage 93, opens the bypass downstream passage 94 by opening the working medium return valve 96, and closes the carbon dioxide discharging passage 95 by closing the discharging valve 97. Further, when the CPU of the second embodiment executes processing of Step 435 of FIG. 4, the CPU switches over the three-way valve 92 in such a manner that the inlet section of the three-way valve 92 is changed to be connected (or communicated) with the other one of the outlet sections of the three-way valve 92 which is connected with the third passage 63, closes the bypass downstream passage 94 by closing the working medium return valve 96, and closes the carbon dioxide discharging passage 95 by closing the discharging valve 97.

Now, a description will be made in a case where conditions to allow performing the maintenance operation for the carbon dioxide absorbing unit 91 are satisfied, and thus, a present time is a timing immediately after a value of a maintenance allowance flag XMT is changed from "0" to "1" by the execution of the routine of FIG. 7. In this case, the CPU starts processing the routine from Step 600 of FIG. 6 at an appropriate timing to proceed to 605 in which the CPU determines whether or not the value of the maintenance allowance flag XMT is "1". The CPU makes a determination of "Yes" in Step 605 to proceed to Step 610 in which the CPU determines whether or not the value of the carbon dioxide separation performing flag F is "0". That is, the CPU determines whether or not the recirculating gas is flowing through the carbon dioxide absorbing unit 91 (i.e., whether or not the carbon dioxide is being absorbed by the carbon dioxide absorbing unit 91) at the present time.

At this time, if the value of the carbon dioxide separation performing flag F is "1", the CPU makes a determination of "No" in Step 610, and stops supplying an electrical energy to the heater 91c in Step 615. Then, the CPU closes the carbon dioxide discharging passage 95 by closing the discharging valve 97 in Step 620, and proceeds to Step 695 to end the present routine tentatively.

As is described above, supplying the electrical energy to the heater 91c is stopped (the heater 91c is turned off, and the heater 91c does not generate heat), and the carbon dioxide discharging passage 95 is closed, when the recirculating gas is flowing through the carbon dioxide absorbing unit 91, and thus, the recirculating gas from which the carbon dioxide has been separated is returned to the fourth passage 64 from the carbon dioxide absorbing unit 91.

On the other hand, if the value of the carbon dioxide separation performing flag F is "0" when the CPU proceeds to Step 610 (i.e., in a case where the recirculating gas does not flow through the carbon dioxide absorbing unit 91), the CPU makes a determination of "Yes" in Step 610 so as to proceeds to Step 625 in which the CPU starts supplying the electrical energy to the heater 91c. Then, the CPU proceeds to Step 630 so as to open the carbon dioxide discharging passage 95 by opening the discharging valve 97.

As a result, the monoethanolamine solution 91b is heated. The monoethanolamine solution 91b has characteristics that its solubility for carbon dioxide sharply decreases as its temperature increases. Accordingly, the carbon dioxide absorbed in the monoethanolamine solution 91b is separated from the monoethanolamine solution 91b to become carbon dioxide gas by supplying the electrical energy to the heater 91c, and the carbon dioxide gas is discharged to air thorough the carbon dioxide discharging passage 95 and the discharging valve 97. As a result, the ability of the monoethanolamine solution 91b for absorbing carbon dioxide begins to be restored.

Next, the CPU proceeds to Step 635 to increment a value T of a timer (heater-on-duration timer) by "1", and then proceeds to Step 640 in which CPU determines whether or not the value T of the timer is equal to or larger than a predetermined threshold Tth. The present time is immediately after the value T of the timer begins to be incremented due to the start to supply the electrical energy to the heater. Thus, the CPU makes a determination of "No" in Step 640 to proceed to Step 695 in which the CPU ends the present routine tentatively. It should be noted that the value T of the timer is set to "0" by the initial routine which is not shown.

Thereafter, when the above state continues, the processing of Step 635 is repeated. Thus, the value T of the timer becomes equal to or larger than the predetermined threshold Tth. When the CPU executes the processing of Step 640 at this time, the CPU makes a determination of "Yes" in Step 640 to proceed to Step 645 in which the CPU stops supplying the electrical energy to the heater 91c, and the CPU closes the carbon dioxide discharging passage 95 by closing the discharging valve 97 in Step 650. Accordingly, an operation for restoring the ability of the monoethanolamine solution 91b for absorbing carbon dioxide is ended, that is, the maintenance operation is completed.

Next, the CPU sets the value of the maintenance allowance flag XMT to "0" in Step 655, and sets the value T of the timer to "0" in Step 660. Then, the CPU proceeds to Step 695 to end the present routine tentatively.

Incidentally, if the value of the maintenance allowance flag XMT is "0" when the CPU starts processing the present routine, the CPU makes a determination of "No" in Step 605. Thus, the CPU executes processing of Step 615 and Step 620, and proceeds to Step 695 to end the present routine tentatively. The description up to here is on the operations for the maintenance of the carbon dioxide absorbing unit 91.

Next, an operation when the CPU sets the value of the maintenance allowance flag XMT to "1" will be described with reference to FIG. 7. The value of the maintenance allowance flag XMT is set to "1" when a count (a value of a carbon dioxide absorbing counter) CN becomes equal to or larger than a predetermined count CNth. The count CN represents the number of event in which the value of the carbon dioxide separation performing flag F is changed from "0" to "1". In other words, the value of the maintenance allowance flag XMT is set to "1" when it is determined that the restoring of the ability of the monoethanolamine solution 91b for absorbing carbon dioxide is necessary, because the count CN becomes equal to or larger than the predetermined count CNth, and thus, the monoethanolamine solution 91b is in a state where it absorbs a lot of carbon dioxide. The count CN is a count of the separation and elimination of the carbon dioxide in the recirculating gas by use of the carbon dioxide absorbing unit 91, and the separation and elimination of the carbon dioxide is performed when the concentration DenCO2 of the carbon dioxide becomes equal to or higher than the predetermined high concentration (the high threshold) DenCO2thH.

More specifically, the CPU starts processing from step 700 at an appropriate timing to proceed to 705 in which the CPU determines whether or not the present time is immediately after (a timing when) the value of a carbon dioxide separation performing flag F is changed from "0" to "1". If the present time is not immediately after the value of a carbon dioxide separation performing flag F is changed from "0" to "1", the CPU makes a determination of "No" in Step 705 to proceed to Step 795 in which the CPU ends the present routine tentatively. Accordingly, the value of the carbon dioxide absorbing counter CN is not changed.

On the other hand, if the present time is immediately after the value of a carbon dioxide separation performing flag F is changed from "0" to "1", the CPU makes a determination of "Yes" in Step 705 to proceed to Step 710 in which the CPU increments the value of the carbon dioxide absorbing counter CN by "1". The value of the carbon dioxide absorbing counter CN is stored into the back up RAM. Next, the CPU determines whether or not the value of the carbon dioxide absorbing counter CN is equal to or larger than the predetermined count CNth. If the value of the carbon dioxide absorbing counter CN is smaller than the predetermined count CNth, the CPU makes a determination of "No" to proceed to Step 795 in which the CPU ends the present routine tentatively. Accordingly, the value of the maintenance allowance flag XMT is maintained at "0".

Thereafter, when the number of event in which the value of the carbon dioxide separation performing flag F is changed from "0" to "1" increases, the value of the carbon dioxide absorbing counter CN becomes equal to or larger than the predetermined count CNth. In this case, when the CPU proceeds to Step 715, the CPU makes a determination of "Yes" in 715 to proceed to Step 720 in which the CPU sets the value of the maintenance allowance flag XMT to "1". Subsequently, the CPU proceeds to Step 725 to set the value of the carbon dioxide absorbing counter CN to "0", and proceeds to Step 795 to end the present routine tentatively.

As is described above, the hydrogen engine according to the second embodiment eliminates (removes) the carbon dioxide from the recirculating gas by the product eliminating means (the product eliminating section 90 including the carbon dioxide absorbing unit 91). Thus, the hydrogen engine 10 can be operated with high thermal efficiency constantly.

In addition, in the hydrogen engine according to the second embodiment, the product eliminating means (the product eliminating section 90) comprises, absorbing material (MEA solution 91b) for absorbing the product (the carbon dioxide);

the heater 91c serving as an enhancing separation means for adding physical action (heat) to the MEA solution 91b so that the carbon dioxide absorbed into (or by) the MEA solution 91b is enhanced to separate from the MEA solution 91b;

the discharging opening (section) and the carbon dioxide discharging passage 95 for discharging the carbon dioxide which is separated by the heater 91c to outside of the recirculating passage (including the bypass passage); and the discharging valve 97 for maintaining either an opening state in which the carbon dioxide discharging passage 95 is opened or a closing state in which the carbon dioxide discharging passage 95 is closed (for opening or closing the discharging passage 95).

Accordingly, the product (the carbon dioxide) absorbed into (or by) the MEA solution 91b serving as the absorbing material is separated (removed) from the MEA solution 91b by the heater 91c serving as the enhancing separation means. Thus, the MEA solution 91b can restore its ability for absorbing carbon dioxide. As a result, the same (single) carbon dioxide absorbing unit 91 (the product eliminating means) can be used for a long period without replacing the carbon dioxide absorbing unit 91.

It should be noted that, in the above embodiment, Step 705 and Step 715 constitute determining means for determining whether or not the MEA solution 91b which is the absorbing material has absorbed carbon dioxide by an amount larger than or equal to a predetermined amount. This determining means can be replaced with another determining means which determines whether or not an accumulated time period is equal to or longer than a predetermined time period, the accumulated time period being a total time in which the hydrogen engine is operated since the ability of the absorbing material for absorbing carbon dioxide was restored (i.e., since the last (previous) maintenance operation was performed) by supplying the electrical energy to the heater 91c. In addition, the determining means can be replaced with still another determining means which determines whether or not an accumulated amount of hydrogen supplied to the hydrogen engine becomes equal to or larger than a predetermined amount since the last maintenance operation is performed.

Modification of the Second Embodiment

A modified hydrogen engine using a recirculating working medium of the second embodiment is different from the hydrogen engine of the second embodiment only in that zeolitic absorbent is filled into the carbon dioxide absorbing unit 91 in place of the monoethanolamine solution 91b. Similarly to the monoethanolamine solution 91b, the zeolitic absorbent discharges (or releases) carbon dioxide which the zeolitic absorbent has absorbed, when a temperature of the zeolitic absorbent becomes high by being heated. Thus, the ability of the zeolitic absorbent for absorbing carbon dioxide can be restored by the maintenance operation described above.

Third Embodiment

Figure 8:
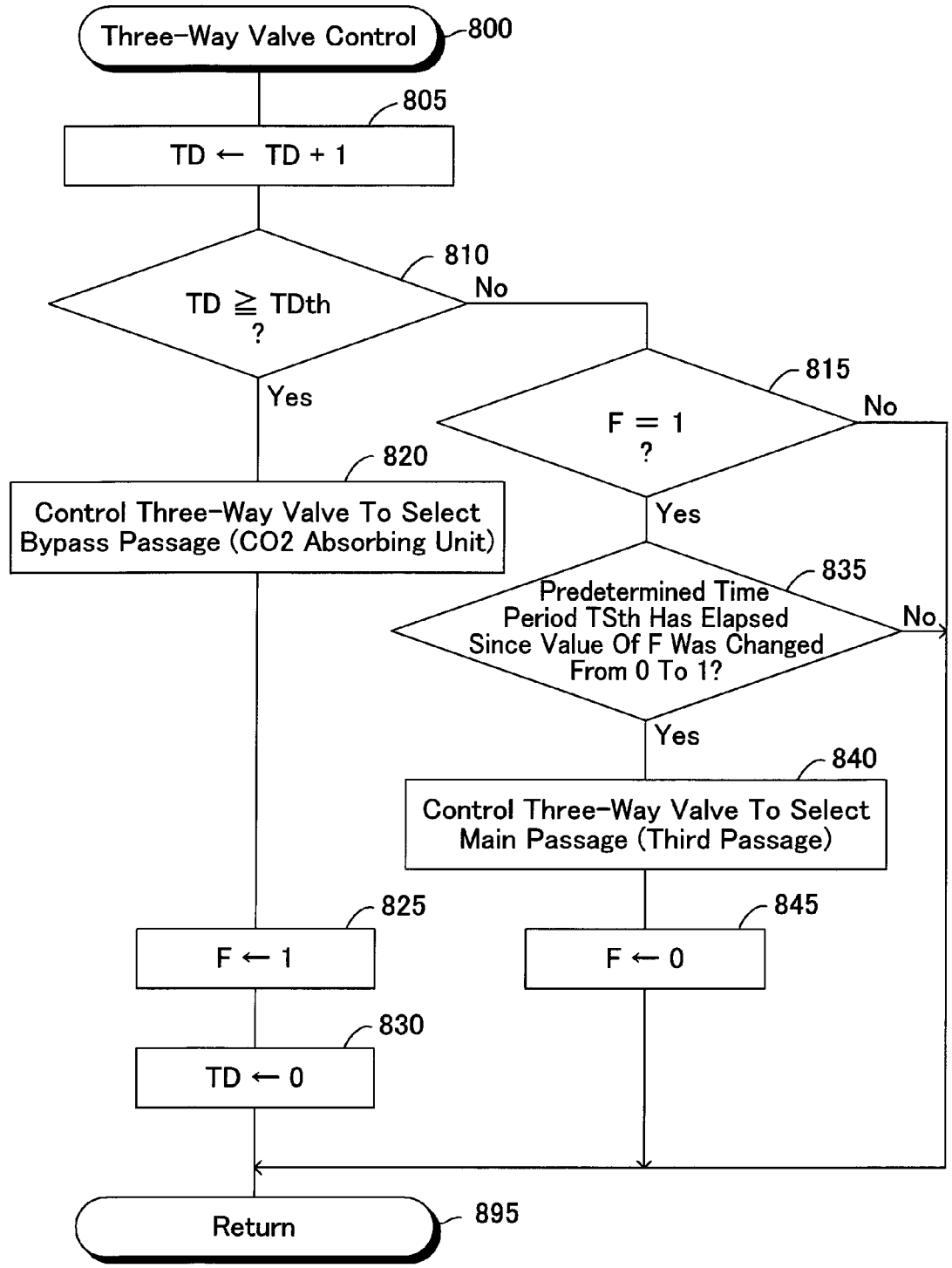
FIG. 8 is a routine, shown by a flowchart, which a CPU of an electric control device executes, the electric control device being one that a hydrogen engine using a recirculating working medium of a third embodiment according to the present invention comprises.

A hydrogen engine using a recirculating working medium of a third embodiment according to the present invention is different from the hydrogen engine of the first embodiment only in that the CPU executes a three-way valve control routine shown by a flowchart in FIG. 8 in place of the three-way valve control routine shown in FIG. 4 which the CPU of the first (or the second) embodiment executes, and the hydrogen engine of the third embodiment does not comprise the carbon dioxide concentration sensor 85. Therefore, the difference will be mainly described hereinafter.

The hydrogen engine of the third embodiment estimates the concentration of the carbon dioxide in the recirculating gas based on an accumulated time period of operation of the hydrogen engine (or a total time in which the engine is operated), and separates and eliminates the carbon dioxide by use of the carbon dioxide absorbing unit 71 when the accumulated time period becomes equal to or longer than a predetermined time period.

More specifically, the CPU starts processing the routine shown in FIG. 8 from Step 800 every time a predetermined time elapses to proceed to Step 805 in which the CPU increments a value of an operation-accumulation-timer TD by "1", the value of the operation-accumulation-timer TD representing the accumulated time period of operation of the hydrogen engine. The value of the operation-accumulation-timer TD is stored into the back up RAM. Next, the CPU proceeds to Step 810 in which the CPU determines whether or not the value of the operation-accumulation-timer TD is equal to or larger than a predetermined time (operation time period threshold) TDth.

Now, a description will be made in a case where the value of the operation-accumulation-timer TD is smaller than the predetermined time TDth, and the separation/elimination of the carbon dioxide by use of the carbon dioxide absorbing unit 71 is not being carried out (the value of the carbon dioxide separation performing flag F is "0"). In this case, the CPU makes a determination of "No" in Step 810, and makes a determination of "No" in Step 815 in which the CPU determines whether or not the value of the carbon dioxide separation performing flag F is "1". Thus, the CPU proceeds to Step 895 to end the present routine tentatively.

As a result, the exhausted gas discharged from the combustion chamber 21 (the recirculating gas) is recirculated through the main passage composed of the first passage 61, the second passage 62, the third passage 63, the fourth passage 64, and the fifth passage 65. In other words, the exhausted gas discharged from the combustion chamber 21 does not flow through the carbon dioxide absorbing unit 71.

Thereafter, the value of the operation-accumulation-timer TD increases by Step 805 when the hydrogen engine is operated, and eventually becomes equal to or larger than the predetermined time TDth. In this case, the CPU makes a determination of "Yes" in Step 810 next to Step 805, and the CPU proceeds to Step 820 in which the CPU control (switch over) the three-way valve 72 in such a manner that the inlet section of the three-way valve 72 is changed to be connected (or communicated) with one of the outlet sections of the three-way valve 72 which is connected with the bypass upstream passage 73.

As a result, the recirculating gas flowing through the second passage 62 does not flow through the third passage 63, but flows through the carbon dioxide absorbing unit 71 (through the monoethanolamine solution 71b accommodated within the passage of the carbon dioxide absorbing unit 71). Therefore, the carbon dioxide included in the recirculating gas is absorbed by (or into) the monoethanolamine solution 71b to be separated from the recirculating gas. The recirculating gas from which the carbon dioxide has been separated is supplied to the fourth passage 64 from the joining point PG via the outlet section of the container 71a and the bypass downstream passage 74. Thereafter, the CPU proceeds to Step 825 to set the value of the carbon dioxide separation performing flag F at "1" and proceeds to Step 830 to set the value of the operation-accumulation-timer TD at "0". Then, the CPU proceeds to Step 895 to end the present routine tentatively.

When the CPU starts processing from Step 800 in FIG. 8 under this state, the CPU proceeds to Step 810 via Step 805. The present time is immediately after the value of the operation-accumulation-timer TD is returned to "0". Thus, the value of the operation-accumulation-timer TD is sufficiently smaller than the predetermined time TDth. Accordingly, the CPU makes a determination of "No" in Step 810 to proceed to Step 815 in which the CPU determines whether or not the value of the carbon dioxide separation performing flag F is "1".

At the present time, the value of the carbon dioxide separation performing flag F is set at "1" in the previous Step 825. Thus, the CPU makes a determination of "Yes" in Step 815 to proceed to Step 835 in which the CPU determines whether or not a predetermined time period (a carbon dioxide separation duration) TSth has elapsed since a timing at which the value of the carbon dioxide separation performing flag F was changed from "0" to "1". It should be noted that the time period TSth is sufficiently shorter than the time TDth. At the present time, the predetermined time period TSth has not elapsed since the timing at which the value of the carbon dioxide separation performing flag F was changed from "0" to "1". Therefore, the CPU makes a determination of "No" in Step 835 to proceed to Step 895 in which the CPU ends the present routine tentatively.

It is presumed that the concentration DenCO2 of the carbon dioxide in the main passage is lower than the predetermined low concentration DenCO2thL, when the predetermined time period TSth has elapsed since the timing at which the value of the carbon dioxide separation performing flag F was changed from "0" to "1". Thus, when the predetermined time period TSth has elapsed since the timing at which the value of the carbon dioxide separation performing flag F was changed from "0" to "1", the CPU makes a determination of "Yes" in Step 835 subsequent to Steps 800-815 to proceed to Step 840. In Step 840, the CPU controls the three-way valve 72 in such a manner that the inlet section of the three-way valve 72 is changed to be connected (or communicated) with the other one of the outlet sections of the three-way valve 72 which is connected with the third passage 63. Accordingly, the exhausted gas discharged from the combustion chamber 21 resumes to be recirculated through the main passage composed of the first to the fifth passages 61-65. Thereafter, the CPU sets the value of the carbon dioxide separation performing flag F to "0" in Step 845, and proceeds to Step 895 to end the present routine tentatively.

As is described above, the hydrogen engine according to the third embodiment comprises a carbon dioxide concentration estimating means for estimating the carbon dioxide concentration (corresponding to Step 805) based on the accumulated time period TD of operation of the hydrogen engine. The hydrogen engine determines that the carbon dioxide concentration becomes excessively large when the accumulated time period TD is longer than the predetermined time TDth, and thus, separates the carbon dioxide from the recirculating gas by the carbon dioxide absorbing unit 71. Accordingly, the hydrogen engine will be provided at low cost, because it is not necessary to adopt the expensive carbon dioxide concentration sensor 85 as the first embodiment uses.

It should be noted that, in the third embodiment, the monoethanolamine solution 71b contained in the carbon dioxide absorbing unit 71 may be replaced with the zeolitic absorbent. Further, similarly to the second embodiment, the heater 91c may be disposed around the container 71a and be made to generate heat as need arises, so that the ability of the monoethanolamine solution 71b or of the zeolitic absorbent for absorbing carbon dioxide is restored.

Fourth Embodiment

Figure 9:
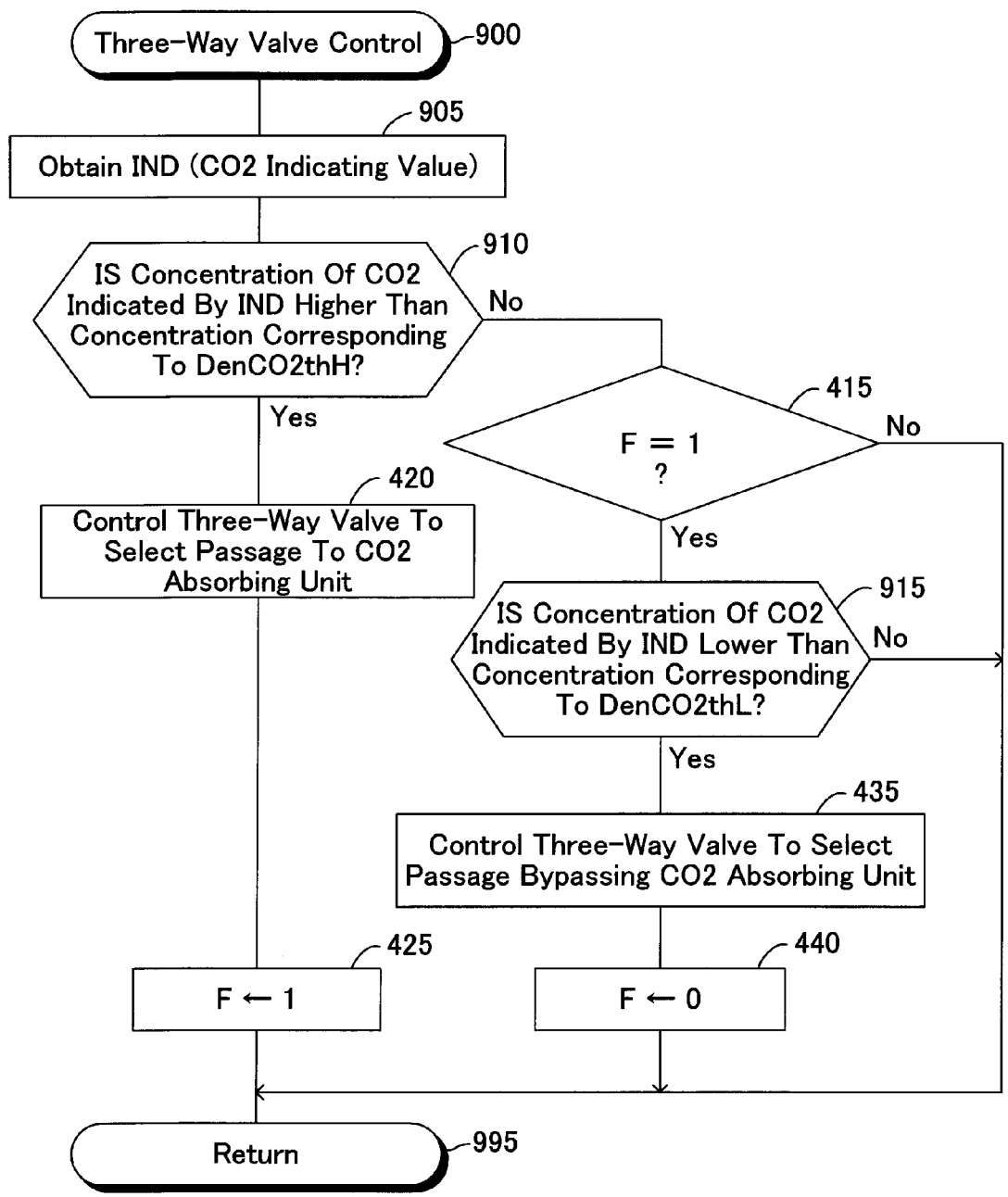
FIG. 9 is a routine, shown by a flowchart, which a CPU of an electric control device executes, the electric control device being one that each hydrogen engine using a recirculating working medium of a fourth to a seventh embodiments according to the present invention comprises.
Figure 10:
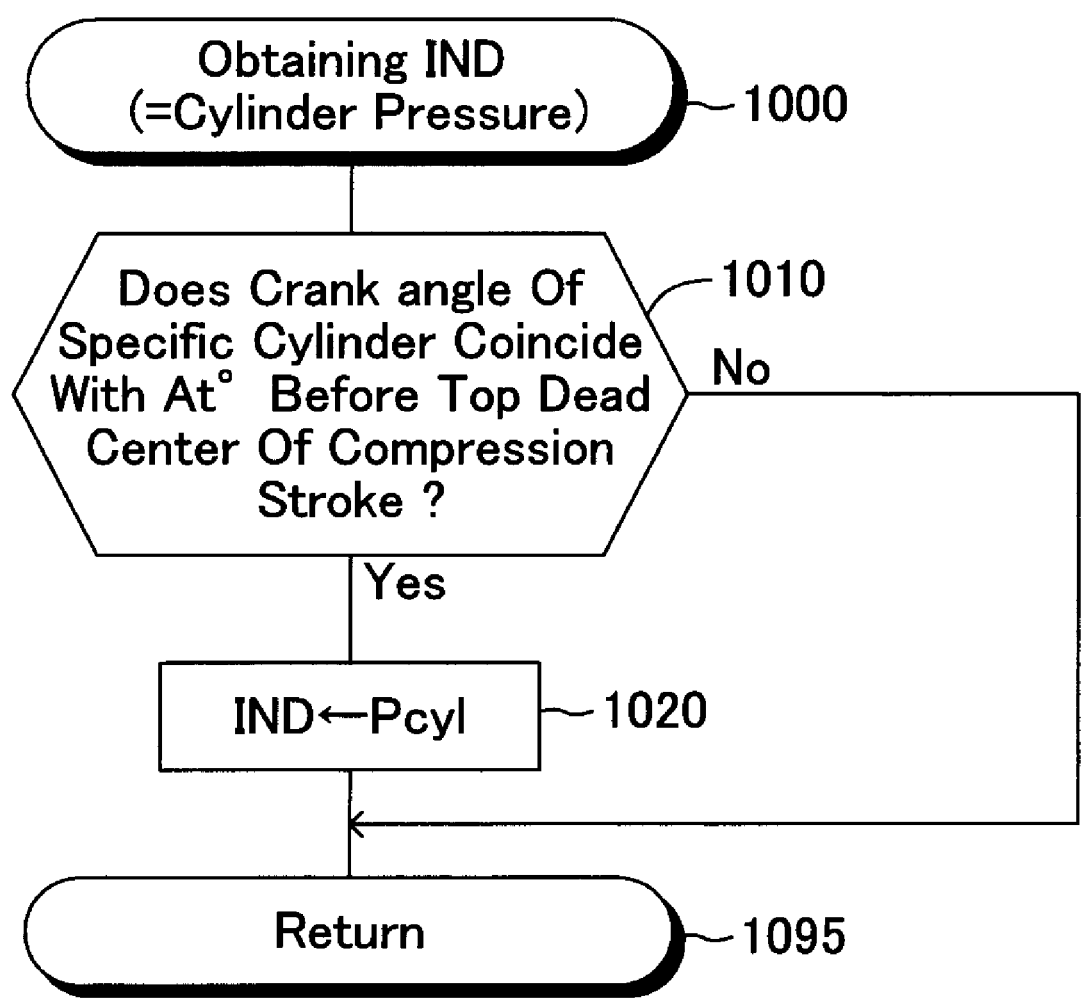
FIG. 10 is a routine, shown by a flowchart, which the CPU of the electric control device executes, the electric control device being one that the hydrogen engine using a recirculating working medium of the fourth embodiment according to the present invention comprises.

A hydrogen engine using a recirculating working medium of a fourth embodiment according to the present invention is different from the hydrogen engine of the first embodiment only in that the CPU executes routines shown by flowcharts in FIGS. 9 and 10 in place of the three-way valve control routine shown in FIG. 4 which the CPU of the first (or the second) embodiment executes, and the hydrogen engine of the fourth embodiment comprises a cylinder pressure sensor which detects a pressure (a cylinder pressure) in the combustion chamber 21 of a specific cylinder in place of the carbon dioxide concentration sensor 85. Therefore, the differences will be mainly described hereinafter.

The hydrogen engine according to the fourth embodiment estimates a concentration of the carbon dioxide in the recirculating gas based on a cylinder pressure of a specific cylinder obtained when a crank angle of the specific cylinder coincides with a predetermined crank angle near the top dead center of a compression stroke (at At° before the top dead center of the compression stroke of the specific cylinder). The hydrogen engine absorbs and separates the carbon dioxide by use of the carbon dioxide absorbing unit 71 when the obtained cylinder pressure (hereinafter referred to as "the specific cylinder pressure") becomes equal to or smaller than a predetermined pressure. In other words, the hydrogen engine determines that the concentration of the carbon dioxide in the recirculating gas becomes equal to or higher than the predetermined high concentration (the high threshold) DenCO2thH, when the specific cylinder pressure becomes equal to or smaller than the predetermined pressure.

More specifically, the CPU starts processing the routine shown in FIG. 9 from Step 900 every time a predetermined time elapses. It should be noted that some Steps shown in FIG. 9 which are identical to some Steps shown in FIG. 4 are given same symbols as those in FIG. 4, and their detailed descriptions are omitted.

The CPU proceeds to Step 905 from Step 900 to obtain a carbon dioxide concentration indicating value IND. In the present embodiment, the carbon dioxide concentration indicating value IND is the cylinder pressure of the specific cylinder (the specific cylinder pressure) when the crank angle of the specific cylinder coincides with At° before the top dead center of the compression stroke of the specific cylinder. The specific cylinder pressure is obtained by the routine in FIG. 10 described later.

Next, the CPU proceeds to Step 910 to determine the concentration of the carbon dioxide indicated by the carbon dioxide concentration indicating value IND is equal to or higher than a concentration corresponding to the predetermined high concentration DenCO2thH. More specifically, the CPU determines whether or not the specific cylinder pressure Pcyl (=IND) is equal to or smaller than a predetermined cylinder pressure Pcylth in Step 910.

Carbon dioxide is a gas composed of three atoms, and thus, its specific heat ratio is smaller than the specific heat ratio of an argon gas serving as the working medium composed of monoatomic gas. Therefore, the cylinder pressure near the end of the compression stroke (at the predetermined crank angle near the top dead center) becomes smaller as the concentration of the carbon dioxide in the recirculating gas becomes higher. Thus, a fact that the specific cylinder pressure Pcyl is equal to or smaller than the predetermined cylinder pressure Pcylth means (indicates) that the concentration of carbon dioxide contained in the recirculating gas becomes equal to or higher than the concentration corresponding to the predetermined high concentration DenCO2thH. In other words, the predetermined cylinder pressure Pcylth is selected to be a value corresponding to the predetermined high concentration DenCO2thH.

If the concentration of the carbon dioxide indicated by the carbon dioxide concentration indicating value IND is equal to or higher than the above mentioned concentration corresponding to the predetermined high concentration DenCO2thH, the CPU executes processing of Step 420 and Step 425. As a result, the recirculating gas flowing through the second passage 62 does not flow through the third passage 63, but flows through the carbon dioxide absorbing unit 71. Therefore, the carbon dioxide included in the recirculating gas is absorbed by (or into) the monoethanolamine solution 71*b* to be separated from the recirculating gas.

On the other hand, if the concentration of the carbon dioxide indicated by the carbon dioxide concentration indicating value IND is not equal to or higher than the above mentioned concentration corresponding to the predetermined high concentration DenCO2thH when the CPU executes processing of Step 910, the CPU proceeds to Step 415 to determine whether or not the value of the carbon dioxide separation performing flag F is "1". At this time, if the value of the carbon dioxide separation performing flag F is "1", and it is determined that the concentration of the carbon dioxide indicated by the carbon dioxide concentration indicating value IND is equal to or lower than a concentration corresponding to the above mentioned predetermined low concentration DenCO2thL in Step 915, the CPU executes processing of Step 435 and Step 440.

As a result, the separation and absorption of the carbon dioxide by the carbon dioxide absorbing unit 71 is stopped, and the exhausted gas discharged from the combustion chamber 21 resumes to be recirculated through the main passage composed of the first to the fifth passages 61-65.

Further, the CPU starts processing the routine shown in FIG. 10 every time a predetermined time elapses. Thus, the CPU starts processing from Step 1000 at an appropriate timing to proceed to Step 1010 in which the CPU determines whether or not the crank angle of the specific cylinder coincides with the predetermined crank angle (BTDC At°) near and before the top dead center of the compression stroke of the cylinder. The predetermined crank angle (BTDC At°) is selected to be a crank angle before the hydrogen injection timing from the hydrogen injection valve 35.

If the crank angle of the specific cylinder coincides with the predetermined crank angle (At°) before the top dead center of the compression stroke of the cylinder, the CPU proceeds to Step 1020 to obtain the cylinder pressure Pcyl as the specific cylinder pressure (the carbon dioxide concentration indicating value) IND, and then proceeds to Step 1095 to end the present routine tentatively. On the other hand, if the crank angle of the specific cylinder does not coincide with the predetermined crank angle (At°) before the top dead center of the compression stroke of the cylinder, the CPU proceeds directly to Step 1095 from Step 1010 to end the present routine tentatively.

As is described above, the hydrogen engine according to the fourth embodiment comprises, cylinder pressure obtaining means (the cylinder pressure sensor and the routine shown in FIG. 10) for obtaining the cylinder pressure Pcyl which is a pressure in the combustion chamber of the specific cylinder when the crank angle of the hydrogen engine (the crank angle of the specific cylinder) coincides with the predetermined crank angle near the top dead center of the compression stroke; and switching control means (Step 420, and so forth) for switching over the path switching means (the three-way valve 72) in such a manner that the gas flowing through the main passage (the second passage 62) upstream of the branch point PB is made to flow through the bypass passage including the bypass upstream passage 73, the bypass downstream passage 74 and the passage formed in the container 71*a*, between (or form) the branch point PB and (or to) the joining point PG, when the obtained cylinder pressure Pcyl (=IND) is smaller than the predetermined pressure Pcylth.

Accordingly, because the carbon dioxide in the recirculating gas is eliminated from the recirculating gas by the carbon dioxide absorbing unit 71 serving as the product eliminating means, the decrease in the thermal efficiency of the hydrogen engine can be avoided. Further, because the recirculating gas does not flow through the bypass passage (thus, the carbon dioxide absorbing unit 71) which has high passage-resistance to flow unless it is necessary, the decrease in the engine efficiency can be avoided.

Fifth Embodiment

Figure 11:
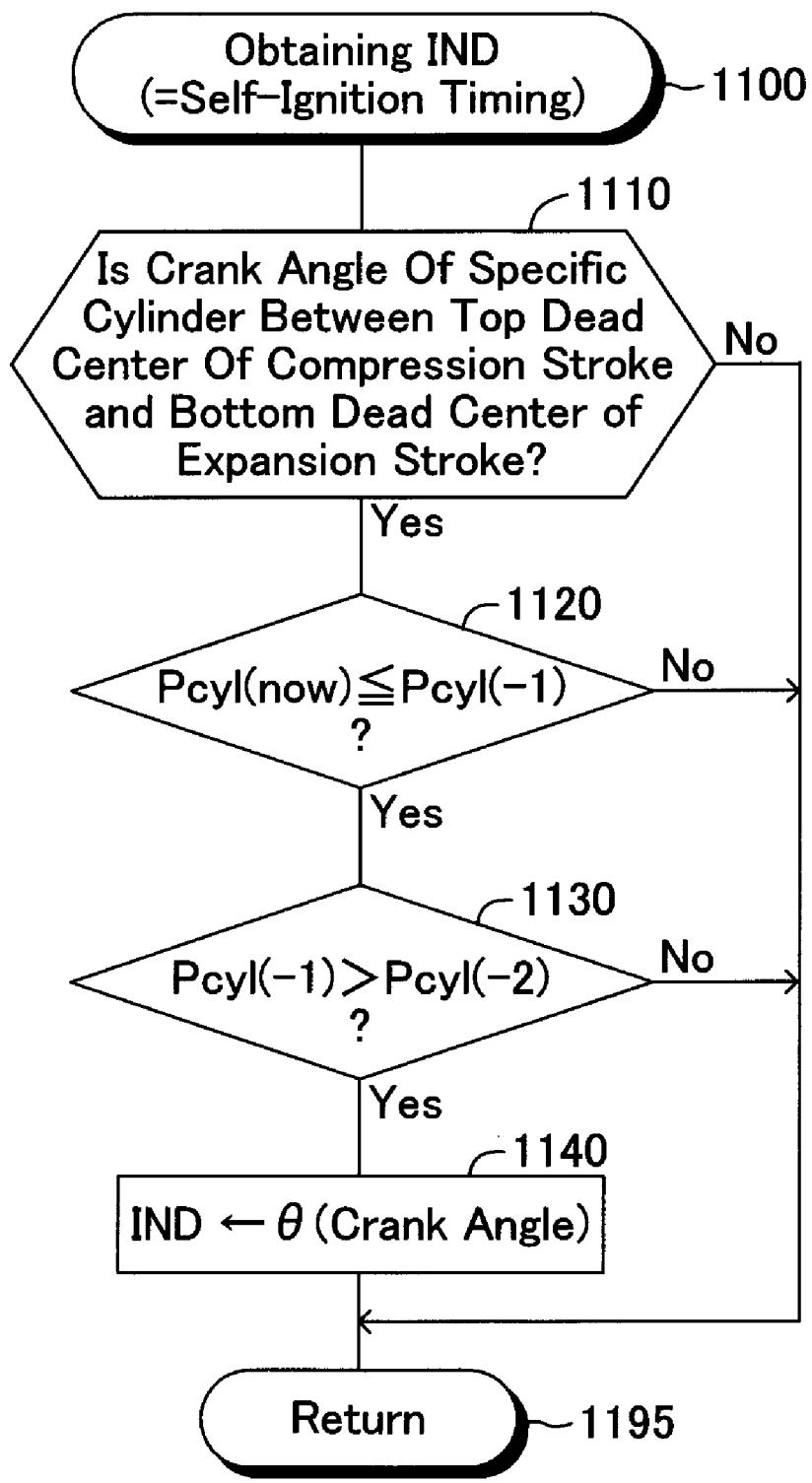
FIG. 11 is a routine, shown by a flowchart, which the CPU of the electric control device executes, the electric control device being one that the hydrogen engine using a recirculating working medium of the fifth embodiment according to the present invention comprises.

A hydrogen engine using a recirculating working medium of a fifth embodiment according to the present invention is different from the hydrogen engine of the first embodiment only in that the CPU executes routines shown by flowcharts in FIGS. 9 and 11 in place of the three-way valve control routine shown in FIG. 4 which the CPU of the first (or the second) embodiment executes, and the hydrogen engine of the fifth embodiment comprises a cylinder pressure sensor which detects a pressure (a cylinder pressure) in the combustion chamber 21 of a specific cylinder in place of the carbon dioxide concentration sensor 85. Therefore, the differences will be mainly described hereinafter.

The hydrogen engine according to the fifth embodiment is a type of an engine in which hydrogen is injected into high temperature and high pressure gas for diffusion combustion, similarly to the engines of the other embodiments. Therefore, a combustion speed (rate) becomes lower, and accordingly, a self-ignition timing delays as the concentration of the carbon dioxide in the recirculating gas becomes higher. In view of this, the hydrogen engine obtains the self-ignition timing based on the cylinder pressure as the carbon dioxide concentration indicating value IND. Further, the hydrogen engine absorbs and separates the carbon dioxide by use of the carbon dioxide absorbing unit 71 when the obtained self-ignition timing reaches a retarded timing compared to a reference self-ignition timing. In other words, the hydrogen engine determines that the concentration of the carbon dioxide in the recirculating gas becomes equal to or higher than the predetermined high concentration (the high threshold) DenCO2thH, when the obtained self-ignition timing becomes a retarded timing compared to the reference self-ignition timing.

More specifically, the CPU starts processing the routine shown in FIG. 9 from Step 900 every time the predetermined time elapses. The engine of the present embodiment uses the self-ignition timing as the carbon dioxide concentration indicating value IND in Step 905 and Step 910 to determine whether or not the self-ignition timing is in a retarded side with reference to the reference self-ignition timing. The self-ignition timing is obtained by the routine shown in FIG. 11. The reference self-ignition timing is set to a self-ignition timing which would be obtained when the concentration of the carbon dioxide coincides with the above mentioned predetermined high concentration DenCO2thH.

In addition, in Step 915, the self-ignition timing is used as the carbon dioxide concentration indicating value IND, and it is determined whether or not the self-ignition timing is in an advanced side with reference to an advanced side reference self-ignition timing which is advanced by a predetermined crank angle with reference to the reference self-ignition timing. The advanced side reference self-ignition timing is set to a self-ignition timing (value) which would be obtained when the concentration of the carbon dioxide coincides with the above mentioned predetermined low concentration DenCO2thL. The other points shown in FIG. 9 are already explained in the description regarding the fourth embodiment, and thus, the detailed description is omitted.

The routine shown in FIG. 11 is a routine for obtaining the self-ignition timing represented by a crank angle as the carbon dioxide concentration indicating value IND. The CPU starts processing the present routine from Step 1100 every time a predetermined time elapses, and proceeds to Step 1110 to determine whether or not a crank angle of the specific cylinder is between a top dead center of a compression stroke and a bottom dead center of an expansion stroke of the specific cylinder. If the crank angle of the specific cylinder is not between the top dead center of the compression stroke and the bottom dead center of the expansion stroke of the specific cylinder, the CPU makes a determination of "No" in Step 1110 to directly proceed to Step 1195 for ending the present routine tentatively.

On the other hand, if the crank angle of the specific cylinder is between the top dead center of the compression stroke and the bottom dead center of the expansion stroke of the specific cylinder at the determination timing in Step 1110, the CPU obtains a crank angle θ at which the cylinder pressure becomes a maximum pressure as the self-ignition timing (that is, the carbon dioxide concentration indicating value IND), by processing Steps 1120-1140 described below.

Step 1120: The CPU determines whether or not a current cylinder pressure Pcyl(now) is equal to or smaller than a cylinder pressure Pcyl(−1) which was obtained when the present routine was previously executed (i.e. before a predetermined time). The CPU proceeds to Step 1130 if the current cylinder pressure Pcyl(now) is equal to or smaller than the cylinder pressure Pcyl(−1). Otherwise, the CPU directly proceeds to Step 1195 to end the present routine tentatively.

Step 1130: The CPU determines whether or not a previous cylinder pressure Pcyl(−1) is larger than a cylinder pressure Pcyl(−2) which was obtained when the present routine was executed two times ago (i.e. before a double of the predetermined time). The CPU proceeds to Step 1140 if the previous cylinder pressure Pcyl(−1) is larger than the last but one cylinder pressure Pcyl(−2). Otherwise, the CPU directly proceeds to Step 1195 to end the present routine tentatively.

The determinations of "Yes" in all Steps from Step 1110 to Step 1130 means (indicates) that the present timing is between the top dead center of the compression stroke and the bottom dead center of the expansion stroke of the specific cylinder, and the cylinder pressure becomes maximum. In view of this, the CPU obtains the current crank angle θ as the carbon dioxide concentration indicating value IND in Step 1140. The obtained crank angle θ is used as the carbon dioxide concentration indicating value IND in the routine shown in FIG. 9, the crank angle θ being the self-ignition timing or a timing corresponding to the self-ignition timing.

As is described above, the self-ignition timing is the carbon dioxide concentration indicating value and is a combustion state indicating value representing a sate of the combustion in the hydrogen engine. The hydrogen engine according to the fifth embodiment comprises, combustion state indicating value obtaining means (the cylinder pressure sensor and the routine shown in FIG. 11) for obtaining the combustion state indicating value (the self-ignition timing); and switching control means (Step 420, and so forth) for switching over the path switching means (the three-way valve 72) in such a manner that the gas flowing through the main passage (the second passage 62) upstream of the branch point PB is made to flow through the bypass passage including the bypass upstream passage 73, the bypass downstream passage 74, and the passage formed in the container 71a, between (or form) the branch point PB and (or to) the joining point PG, when the obtained combustion state indicating value indicates that the combustion state is worse than predetermined combustion state, i.e., when the self-ignition timing is in a retarded side with reference to the predetermined timing (the reference self-ignition timing) due to excessively high concentration of the carbon dioxide.

Accordingly, because the carbon dioxide in the recirculating gas, which causes deterioration in the combustion state, is eliminated from the recirculating gas by the carbon dioxide absorbing unit 71 serving as the product eliminating means, the decrease in the thermal efficiency of the hydrogen engine can be avoided. Further, because the recirculating gas does not flow through the bypass passage (thus, the carbon dioxide absorbing unit 71) which has high passage-resistance to flow unless it is necessary, the decrease in the engine efficiency can be avoided.

Sixth Embodiment

Figure 12:
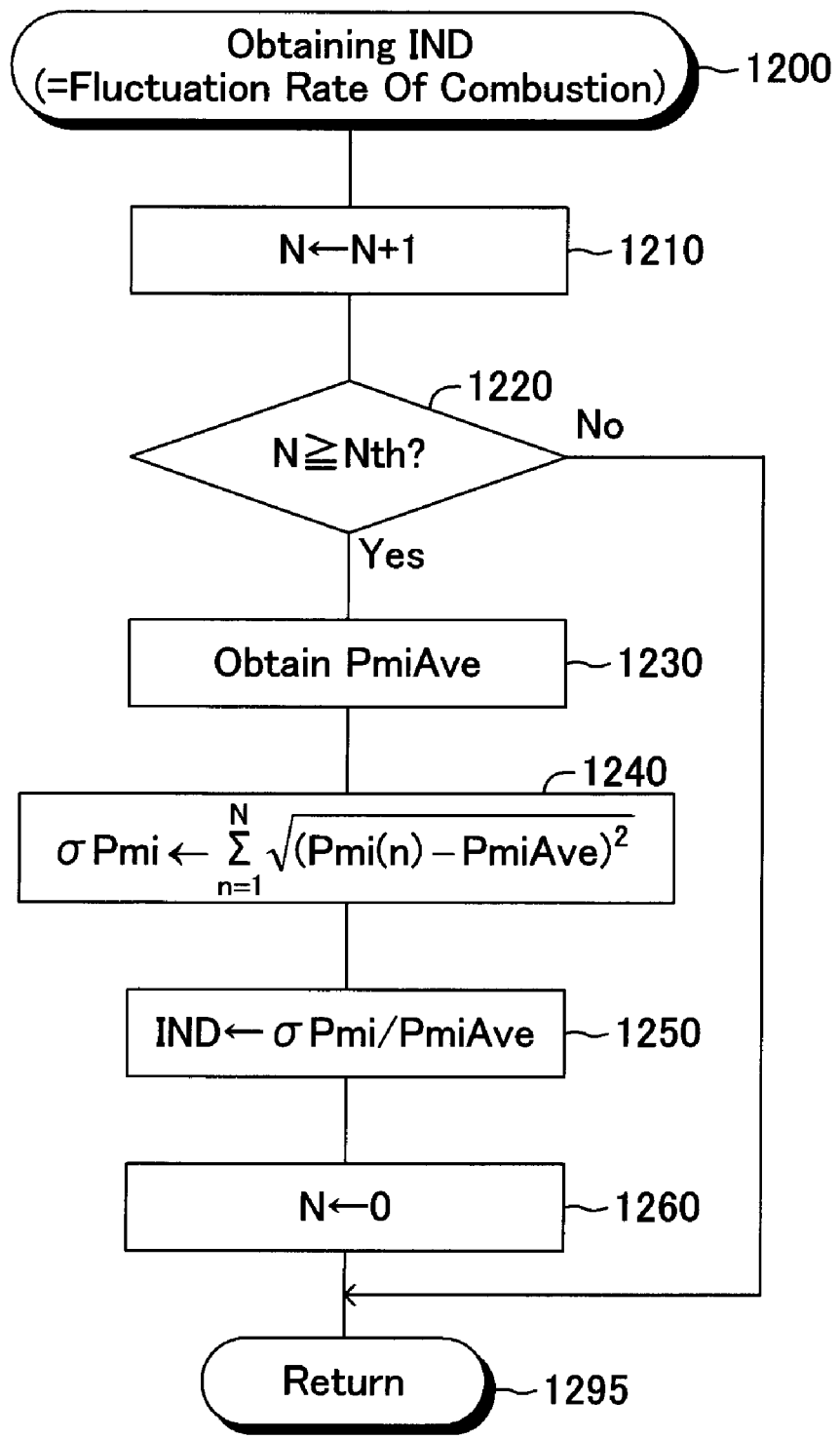
FIG. 12 is a routine, shown by a flowchart, which the CPU of the electric control device executes, the electric control device being one that the hydrogen engine using a recirculating working medium of the sixth embodiment according to the present invention comprises.

A hydrogen engine using a recirculating working medium of a sixth embodiment according to the present invention is different from the hydrogen engine of the first embodiment only in that the CPU executes routines shown by flowcharts in FIGS. 9 and 12 in place of the three-way valve control routine shown in FIG. 4 which the CPU of the first (or the second) embodiment executes, and the hydrogen engine of the sixth embodiment comprises a cylinder pressure sensor which detects a pressure (a cylinder pressure) in the combustion chamber 21 of a specific cylinder in place of the carbon dioxide concentration sensor 85. Therefore, the differences will be mainly described hereinafter.

The hydrogen engine according to the sixth embodiment is a type of an engine in which hydrogen is injected into high temperature and high pressure gas for diffusion combustion, similarly to the engines of the other embodiments. Therefore, fluctuation (change) in the combustion state described later becomes larger due to decrease in the combustion speed as the concentration of the carbon dioxide in the recirculating gas becomes higher.

In view of this, the hydrogen engine obtains the fluctuation rate of the combustion and uses the obtained fluctuation rate of the combustion as the carbon dioxide concentration indicating value IND. Further, the hydrogen engine absorbs and separates the carbon dioxide by use of the carbon dioxide absorbing unit 71 when the obtained fluctuation rate of the combustion is equal to or larger than a reference fluctuation rate of the combustion. In other words, the hydrogen engine determines that the concentration of the carbon dioxide in the recirculating gas becomes equal to or higher than the predetermined high concentration (the high threshold) DenCO2thH, when the fluctuation rate of the combustion is equal to or larger than the reference fluctuation rate of the combustion.

More specifically, the CPU starts processing the routine shown in FIG. 9 from Step 900 every time the predetermined time elapses. The engine of the present embodiment uses the fluctuation rate of the combustion as the carbon dioxide concentration indicating value IND in Step 905 and Step 910 to determine whether or not the fluctuation rate of the combustion is equal to or larger than the reference fluctuation rate of the combustion. The fluctuation rate of the combustion is obtained by the routine shown in FIG. 12. The reference fluctuation rate of the combustion is set to a value corresponding to a fluctuation rate of the combustion which would be obtained when the concentration of the carbon dioxide coincides with the above mentioned predetermined high concentration DenCO2thH.

In addition, in Step 915, the fluctuation rate of the combustion is used as the carbon dioxide concentration indicating value IND and it is determined whether or not the fluctuation rate of the combustion is smaller than a stable fluctuation rate of the combustion which is smaller than the reference fluctuation rate of the combustion. The stable fluctuation rate of the combustion is set to a value corresponding to a fluctuation rate of the combustion which would be obtained when the concentration of the carbon dioxide coincides with the above mentioned predetermined low concentration DenCO2thL. The other points shown in FIG. 9 are already explained in the description regarding the above mentioned fourth embodiment, and thus, the detailed description is omitted.

The routine shown in FIG. 12 is a routine for obtaining the fluctuation rate of the combustion as the carbon dioxide concentration indicating value IND. The CPU starts processing the present routine from Step 1200 every time a predetermined time elapses, and proceeds to Step 1210 to increment a value of a sampling counter N by "1". Next, in Step 1220, the CPU determines whether or not the value of the sampling counter N is equal to or larger than a predetermined value Nth. If the value of the sampling counter N is not equal to or larger than a predetermined value Nth, the CPU makes a determination of "No" in Step 1220 to directly proceed to Step 1295 for ending the present routine tentatively.

On the other hand, if the value of the sampling counter N is equal to or larger than the predetermined value Nth at the determination timing in Step 1220, the CPU obtains the fluctuation rate of the combustion ($\sigma Pmi/PmiAve$) as the carbon dioxide concentration indicating value IND, by processing Steps 1230-1250 described below.

Step 1230: The CPU obtains a mean value of last N of indicated mean effective pressures Pmi as a mean value PmiAve. The indicated mean effective pressure Pmi is obtained for each of cycles of the specific cylinder based on the outputs from the cylinder pressure sensor and crank angles according to a well known method.

Step 1240: The CPU calculates a fluctuating value $\sigma Pmi$ of the indicated mean effective pressures according to a formula shown in a block of Step 1240 of FIG. 12. That is, the CPU obtains, for the last N of the indicated mean effective pressures Pmi, a square root of a square of difference between the indicated mean effective pressures Pmi and the mean value PmiAve, and sums up these obtained values to obtain the fluctuating value $\sigma Pmi$.

Step 1250: The CPU obtains, as the carbon dioxide concentration indicating value IND, the fluctuation rate of the combustion ($\sigma Pmi/PmiAve$) which is a value obtained by dividing the obtained fluctuating value $\sigma Pmi$ by the mean value PmiAve of the indicated mean effective pressures Pmi. The thus obtained fluctuation rate of the combustion ($\sigma Pmi/PmiAve$) is used as the carbon dioxide concentration indicating value IND in the routine of FIG. 9.

As is described above, the fluctuation rate of the combustion ($\sigma Pmi/PmiAve$) is the carbon dioxide concentration indicating value, and is also a combustion state indicating value representing the sate of the combustion in the hydrogen engine. The hydrogen engine according to the sixth embodiment comprises, combustion state indicating value obtaining means (the cylinder pressure sensor and the routine shown in FIG. 12) for obtaining the combustion state indicating value (the fluctuation rate of the combustion); and switching control means (Step 420, and so forth) for switching over the path switching means (the three-way valve 72) in such a manner that the gas flowing through the main passage (the second passage 62) upstream of the branch point PB is made to flow through the bypass passage including the bypass upstream passage 73, the bypass downstream passage 74, and the passage formed in the container 71$a$, between (or form) the branch point PB and (or to) the joining point PG, when the obtained combustion state indicating value indicates that the combustion state is worse than predetermined combustion state, i.e., when the fluctuation rate of the combustion (σPmi/PmiAve) is larger than the reference fluctuation rate of the combustion due to excessively high concentration of the carbon dioxide.

Accordingly, because the carbon dioxide in the recirculating gas, which causes deterioration in the combustion state, is eliminated from the recirculating gas by the carbon dioxide absorbing unit 71 serving as the product eliminating means, the decrease in the thermal efficiency of the hydrogen engine can be avoided. Further, because the recirculating gas does not flow through the bypass passage (thus, the carbon dioxide absorbing unit 71) which has high passage-resistance to flow unless it is necessary, the decrease in the engine efficiency can be avoided.

Seventh Embodiment

Figure 13:
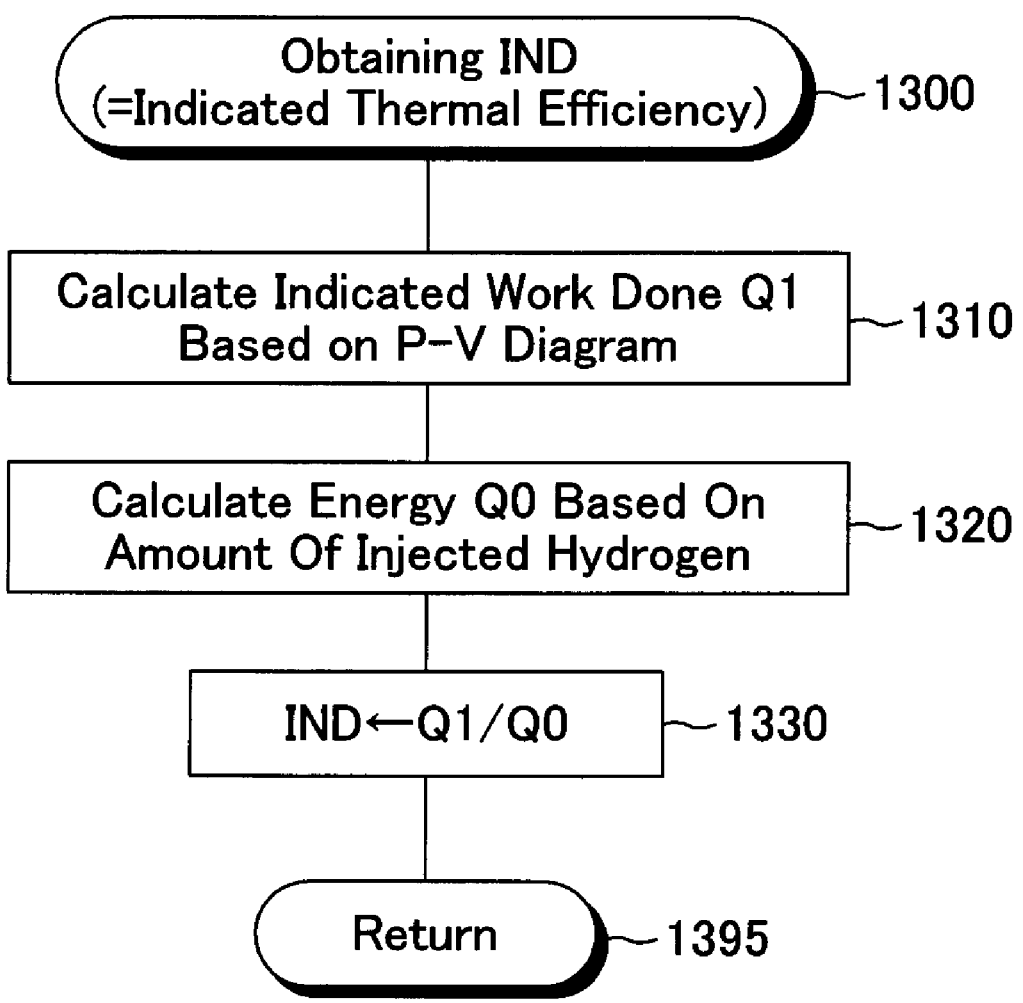
FIG. 13 is a routine, shown by a flowchart, which the CPU of the electric control device executes, the electric control device being one that the hydrogen engine using a recirculating working medium of the seventh embodiment according to the present invention comprises.

A hydrogen engine using a recirculating working medium of the seventh embodiment according to the present invention is different from the hydrogen engine of the first embodiment only in that the CPU executes routines shown by flowcharts in FIGS. 9 and 13 in place of the three-way valve control routine shown in FIG. 4 which the CPU of the first (or the second) embodiment executes, and the hydrogen engine of the seventh embodiment comprises a cylinder pressure sensor which detects a pressure (a cylinder pressure) in the combustion chamber 21 of a specific cylinder in place of the carbon dioxide concentration sensor 85. Therefore, the differences will be mainly described hereinafter.

As is described above, the specific heat of a carbon dioxide gas is smaller that the specific heat of an argon gas. Therefore, the thermal efficiency of the hydrogen engine decreases as the concentration of the carbon dioxide in the recirculating gas becomes higher. In view of this, the present hydrogen engine calculates an indicated thermal efficiency of the hydrogen engine to obtain it as the carbon dioxide concentration indicating value IND. Further, the hydrogen engine absorbs and separates the carbon dioxide by use of the carbon dioxide absorbing unit 71 when the obtained indicated thermal efficiency is equal to or lower than a reference indicated thermal efficiency. In other words, the hydrogen engine determines that the concentration of the carbon dioxide in the recirculating gas becomes equal to or higher than the predetermined high concentration (the high threshold) DenCO2thH, when the indicated thermal efficiency is equal to or lower than the reference indicated thermal efficiency.

More specifically, the CPU starts processing the routine shown in FIG. 9 from Step 900 every time a predetermined time elapses. The engine of the present embodiment uses the indicated thermal efficiency as the carbon dioxide concentration indicating value IND in Step 905 and Step 910 to determine whether or not the indicated thermal efficiency is equal to or lower than the reference indicated thermal efficiency. The indicated thermal efficiency is obtained by the routine shown in FIG. 13. The reference indicated thermal efficiency is set to a value corresponding to an indicated thermal efficiency which would be obtained when the concentration of the carbon dioxide coincides with the above mentioned predetermined high concentration DenCO2thH.

In addition, in Step 915, the indicated thermal efficiency is used as the carbon dioxide concentration indicating value IND and it is determined whether or not the indicated thermal efficiency is equal to or higher than a high reference indicated thermal efficiency which is higher than the reference indicated thermal efficiency. The high reference indicated thermal efficiency is set to a value corresponding to an indicated thermal efficiency which would be obtained when the concentration of the carbon dioxide coincides with the above mentioned predetermined low concentration DenCO2thL. The other points shown in FIG. 9 are already explained in the description regarding the above mentioned fourth embodiment, and thus, the detailed description is omitted.

The routine shown in FIG. 13 is a routine for obtaining the indicated thermal efficiency as the carbon dioxide concentration indicating value IND. The CPU starts processing the present routine from Step 1300 every time a predetermined time elapses, and proceeds to Step 1310 to calculate an indicated work done Q1 based on a pressure volume diagram (P-V diagram) drawn according to a cylinder pressure of the specific cylinder (output from the cylinder pressure sensor) P and a volume V of the combustion chamber of the cylinder. Next, in Step 1320, the CPU calculates an amount of hydrogen injected into the specific cylinder in a cycle for which the indicated work done Q1 is obtained based on the required amount of hydrogen SH2 or the hydrogen injection time TAU, and thereafter, calculates an energy Q0 supplied to the specific cylinder based on the amount of hydrogen injected into the specific cylinder.

Next, the CPU proceeds to Step 1330 to obtain, as the carbon dioxide concentration indicating value IND, the indicated thermal efficiency (Q1/Q0) which is a value obtained by dividing the indicated work done Q1 by the energy Q0. The obtained indicated thermal efficiency (Q1/Q0) is used as the carbon dioxide concentration indicating value IND in the routine shown in FIG. 9.

As is described above, the indicated thermal efficiency (Q1/Q0) is the carbon dioxide concentration indicating value and is also a combustion state indicating value representing the sate of the combustion in the hydrogen engine. The hydrogen engine according to the seventh embodiment comprises, combustion state indicating value obtaining means (the cylinder pressure sensor and the routine shown in FIG. 13) for obtaining the combustion state indicating value (the indicated thermal efficiency); and switching control means (Step 420, and so forth) for switching over the path switching means (the three-way valve 72) in such a manner that the gas flowing through the main passage (the second passage 62) upstream of the branch point PB is made to flow through the bypass passage including the bypass upstream passage 73, the bypass downstream passage 74, and the passage formed in the container 71$a$, between (or form) the branch point PB and (or to) the joining point PG, when the obtained combustion state indicating value indicates that the combustion state is worse than predetermined combustion state, i.e., when the obtained indicated thermal efficiency (Q1/Q0) is equal to or lower than the reference indicated thermal efficiency due to excessively high concentration of the carbon dioxide.

Accordingly, because the carbon dioxide in the recirculating gas, which causes deterioration in the combustion state, is eliminated from the recirculating gas by the carbon dioxide absorbing unit 71 serving as the product eliminating means, the decrease in the thermal efficiency of the hydrogen engine can be avoided. Further, because the recirculating gas does not flow through the bypass passage (thus, the carbon dioxide absorbing unit 71) which has high passage-resistance to flow unless it is necessary, the decrease in the engine efficiency can be avoided.

As is described above, each of the hydrogen engines using a recirculating working medium and their systems of the embodiments according to the present invention separates and eliminates (removes) the carbon dioxide, which is inevitably generated and included in the recirculating gas, from the recirculating gas. Therefore, the hydrogen engines as configured above can be operated with high thermal efficiency constantly.

It should be noted that the present invention is not limited the above embodiments, but may be modified as appropriate without departing from the scope of the invention. For instance, the engine 10 utilizes the diffusion combustion of hydrogen, however, the hydrogen engine may be a type of an engine in which hydrogen is compressed to be self-ignited or a type of an engine in which hydrogen is combusted by flame propagating using spark ignition generated by a spark plug disposed at the combustion chamber 21.

In addition, in each of the hydrogen engines described above, the hydrogen gas is injected directly into the combustion chamber. However, the hydrogen injection valve 35 may be disposed in such a manner that the hydrogen gas is injected from the hydrogen injection valve 35 into the intake port 31. Further, in each of the above embodiments, the argon gas is used as the working medium. However, any other monoatomic gases (e.g., an inert gas other than an argon gas such as He, and so forth) whose specific heat ratio is higher than the specific heat ratio of a carbon dioxide gas may be used as the working medium.

Furthermore, in each of the embodiments, the carbon dioxide is eliminated (removed) from the recirculating gas as the product generated (formed) in the combustion chamber other than $H_2O$. However, the other products (e.g., Nox and/or HC) may be eliminated from the recirculating gas in a similar manner. In addition, the MEA solution or the zeolitic absorbent is used as the material for absorbing the carbon dioxide. However, in place of these, the other materials which can selectively absorb the products, such as the carbon dioxide and the like, which should be eliminated, may be used.

Still further, a fluctuation rate of self-ignition timing can be used as the carbon dioxide concentration indicating value IND and/or as the combustion state indicating value. Furthermore, if the hydrogen engine is a type of an engine in which hydrogen is combusted by flame propagating using spark ignition, a flame propagation speed becomes lower as the concentration of the carbon dioxide becomes higher. Accordingly, the cylinder pressure during a combustion stroke (or an expansion stroke) changes more gradually as the concentration of the carbon dioxide becomes higher. Therefore, a change rate or a way of the cylinder pressure in the combustion stroke may be used as the carbon dioxide concentration indicating value IND and/or as the combustion state indicating value, for instance.

The invention claimed is:

1. A hydrogen engine using a recirculating working medium, wherein hydrogen, oxygen, and a working medium composed of a monoatomic gas is supplied to a combustion chamber to combust the hydrogen, and the working medium included in an exhaust gas discharged from the combustion chamber is recirculated to the combustion chamber through a recirculating passage, the hydrogen engine having product eliminating means, disposed in the recirculating passage, for eliminating carbon dioxide produced in the combustion chamber, wherein the product eliminating means comprises:

an absorbing material configured to absorb the carbon dioxide; and
a discharging opening section configured to discharge the carbon dioxide from the absorbing material to ambient air outside of the hydrogen engine, wherein
the recirculating passage comprises a main passage and a bypass passage which branches from the main passage at a branch point and joins to the main passage at a joining point downstream of the branch point, and the product eliminating means is disposed in the bypass passage,
the hydrogen engine further comprising a path switching means, disposed at the branch point, for selecting either a first state in which the gas flowing through the main passage upstream of the branch point is made to flow through the main passage from the branch point to the joining point or a second state in which the gas flowing through the main passage upstream of the branch point is made to flow through the bypass passage from the branch point to the joining point.

2. A hydrogen engine using a recirculating working medium as described in claim 1, wherein the product eliminating means comprises,
a container having a passage which constitute a portion of the recirculating passage; and
a monoethanolamine solution contained in the passage of the container or a zeolitic absorbent contained in the passage of the container.

3. A hydrogen engine using a recirculating working medium as described in claim 1, wherein the product eliminating means further comprises
enhancing separation means for adding physical action to the absorbing material in such a manner that the carbon dioxide absorbed by the absorbing material is enhanced to separate from the absorbing material; and
wherein the discharging opening section discharges the carbon dioxide which is separated from the absorbing material.

4. A hydrogen engine using a recirculating working medium as described in claim 3, wherein
the absorbing material is either a monoethanolamine solution which absorbs the carbon dioxide by dissolving the carbon dioxide or a zeolitic absorbent which absorbs the carbon dioxide by sorbing the carbon dioxide; and
the enhancing separation means is a heating means for heating the absorbing material.

5. A hydrogen engine using a recirculating working medium as described in claim 1, further comprising
carbon dioxide concentration obtaining means for obtaining a concentration of carbon dioxide contained in gas flowing through the main passage; and
switching control means for switching over the path switching means in such a manner that the gas flowing through the main passage upstream of the branch point is made to flow through the bypass passage between the branch point and the joining point, when the obtained concentration of carbon dioxide is higher than a predetermined concentration.

6. A hydrogen engine using a recirculating working medium as described in claim 5, wherein the carbon dioxide concentration obtaining means is a carbon dioxide concentration sensor which detects the carbon dioxide concentration.

7. A hydrogen engine using a recirculating working medium as described in claim 5, wherein the carbon dioxide concentration obtaining means is carbon dioxide concentration estimating means for estimating the carbon dioxide concentration based on accumulated time period of operation of the hydrogen engine.

8. A hydrogen engine using a recirculating working medium as described in claim 1, further comprising cylinder pressure obtaining means for obtaining a cylinder pressure which is a pressure in the combustion chamber when a crank angle of the engine coincides with a predetermined crank angle near a top dead center of a compression stroke; and switching control means for switching over the path switching means in such a manner that the gas flowing through the main passage upstream of the branch point is made to flow through the bypass passage between the branch point and the joining point, when the obtained cylinder pressure is smaller than a predetermined pressure.

9. A hydrogen engine using a recirculating working medium as described in claim 1, further comprising combustion state indicating value obtaining means for obtaining a combustion state indicating value indicative of combustion state in the engine; and switching control means for switching over the path switching means in such a manner that the gas flowing through the main passage upstream of the branch point is made to flow through the bypass passage between the branch point and the joining point, when the obtained combustion state indicating value indicates that the combustion state is worse than predetermined combustion state.

\* \* \* \* \*